United States Patent [19]

Naito et al.

[11] Patent Number: 4,965,858
[45] Date of Patent: Oct. 23, 1990

[54] POLARIZATION DIVERSITY OPTICAL RECEIVER FOR COHERENT OPTICAL COMMUNICATION

[75] Inventors: Takao Naito; Terumi Chikama; Shigeki Watanabe; Tetsuya Kiyonaga; Yoshihito Onoda; Hideo Kuwahara; Hiroshi Onaka; Hideyuki Miyata, all of Kawasaki, Japan

[73] Assignee: Fujitsu Limited, Kawasaki, Japan

[21] Appl. No.: 310,628

[22] Filed: Feb. 14, 1989

[30] Foreign Application Priority Data

Feb. 19, 1988 [JP] Japan .................... 63-038021

[51] Int. Cl.$^5$ ............................ H04B 10/06
[52] U.S. Cl. ................................ 455/619
[58] Field of Search .......... 455/600, 606, 607, 612, 455/616, 617, 619

[56] References Cited

U.S. PATENT DOCUMENTS 4,732,447  3/1988  Wright ........................ 455/619
4,912,527  3/1990  Yamazaki ................... 455/619

FOREIGN PATENT DOCUMENTS 0314491   5/1989   European Pat. Off. ........... 455/616
63-001124 1/1988   Japan .
63-019928 1/1988   Japan .
8607513  12/1986   World Int. Prop. O. ......... 455/616

Primary Examiner—Joseph A. Orsino
Assistant Examiner—L. Van Beek
Attorney, Agent, or Firm—Staas & Halsey

[57] ABSTRACT

A polarized wave diversity optical receiver for coherent optical communication including: an optical local oscillating circuit (7) for oscillating local oscillating light; a mixing circuit (8) for mixing signal light and the local oscillating light to obtain two polarized components; a detecting circuit (9) for detecting the polarized component to output intermediate frequency signals ($e_S$ and $e_P$); and a frequency control circuit (11) for controlling, in accordance with the intermediate frequency signals ($e_S$ and $e_P$), the oscillating frequency of the optical local oscillating circuit (7). To ensure that the intermediate frequency does not disappear, the frequency control circuit (11) outputs a combined signal of a sum and a difference of the intermediate frequency signals ($e_S$ and $e_P$).

39 Claims, 19 Drawing Sheets

1st PRINCIPLE OF INVENTION

COHERENT OPTICAL COMMUNICATION SYSTEM

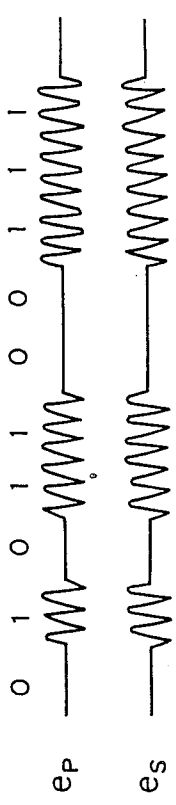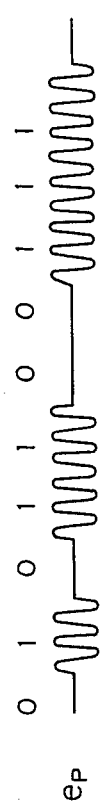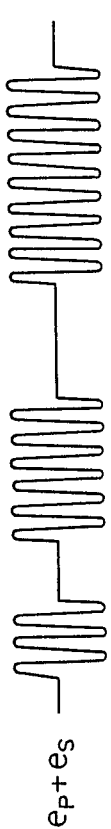
Fig.3A  Fig.3B  Fig.3C  Fig.9A  Fig.9B  Fig.9C  Fig.9D 1st PRINCIPLE OF INVENTION 3rd PRINCIPLE OF INVENTION

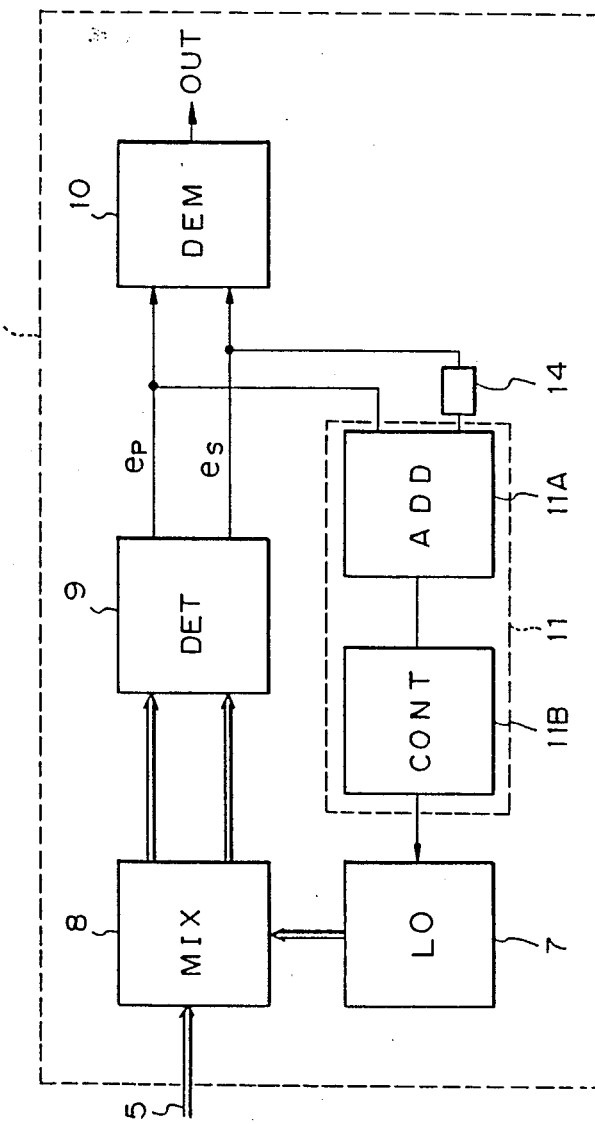
Fig. 7  4th PRINCIPLE OF INVENTION

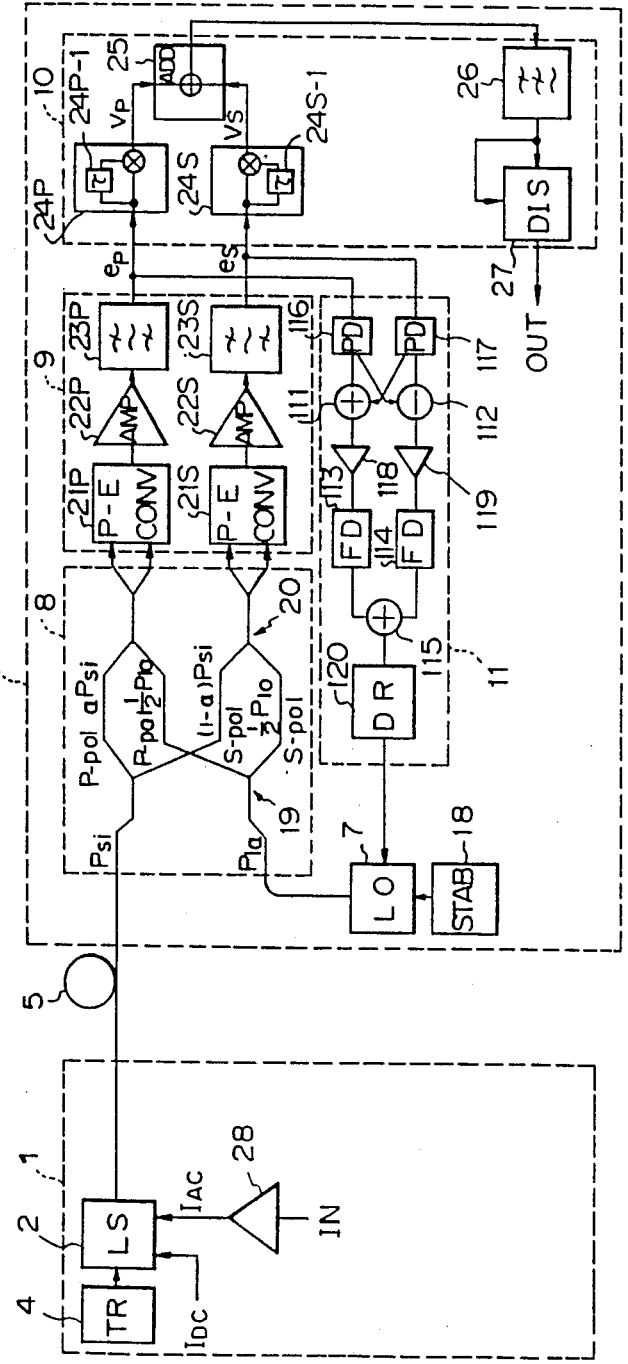
Fig. 8  1st EMBODIMENT (SUM & DIFFERENCE, FSK)

2nd MODE IN 1st EMBODIMENT
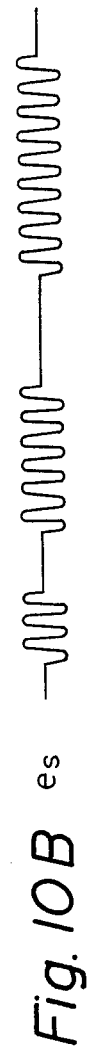
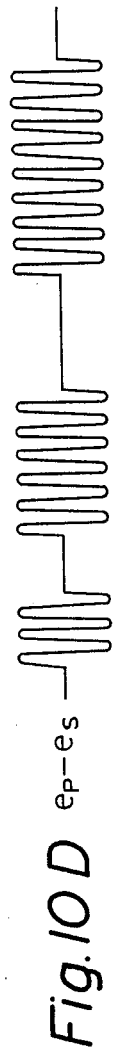
Fig.10A $e_P$
Fig.10B $e_S$
Fig.10C $e_P+e_S$
Fig.10D $e_P-e_S$ 2nd EMBODIMENT (DELAY BEFORE SUM AND DIFFERENCE FSK)

3rd EMBODIMENT (DOUBLE BEFORE SUM AND DIFFERENCE, DPSK)

4 th EMBODIMENT (DELAY AND DOUBLERS BEFORE SUM AND DIFFERENCE, DPSK)

5th EMBODIMENT (POLARIZED COMPONENT MODULATION, FSK)

6th EMBODIMENT (POLARIZED COMPONENT MODULATION BY SEMICONDUCTOR LASERS, FSK)

7th EMBODIMENT (DETECTED COMPONENT MODULATION, ISK)

8th EMBODIMENT (POLARIZED COMPONENT MODULATION, DPSK)

9th EMBODIMENT (POLARIZED COMPONENT MODULATION BY SEMICONDUCTOR LASERS, DPSK)

TENth EMBODIMENT (DETECTED COMPONENT MODULATION, DPSK)

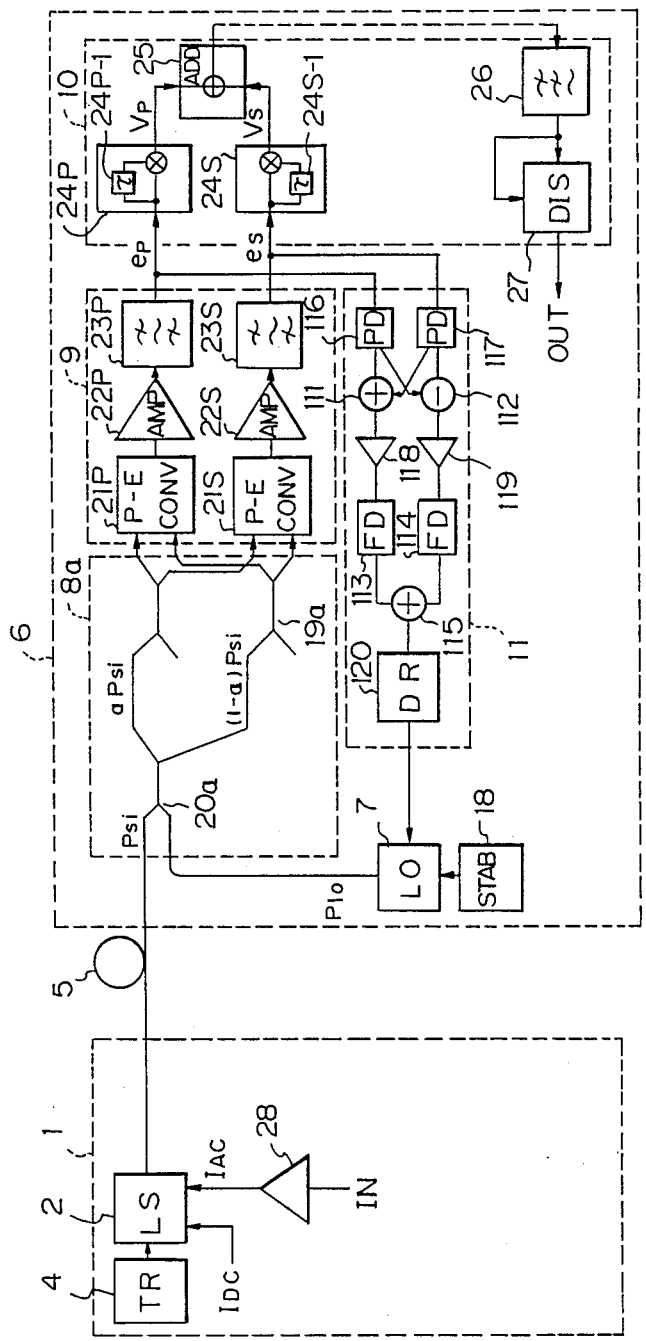
Fig. 20  MODIFICATION OF 1st EMBODIMENT (SUM & DIFFERENCE, FSK)

POLARIZATION DIVERSITY OPTICAL RECEIVER FOR COHERENT OPTICAL COMMUNICATION

BACKGROUND OF THE INVENTION

1 Field of the Invention

The present invention relates to a polarization wave diversity optical receiver for coherent heterodyne optical communication, and more particularly, to a polarization wave diversity optical receiver utilizing a baseband combining method.

A coherent optical communication method utilizing the amplitude, frequency and phase, etc., of a light carrier having a high coherency to provide an optimum optical communication, has become widely used. A problem arises when realizing such a coherent optical communication method from the fluctuation of the state of the polarization wave, and as a countermeasure thereto, a polarization wave diversity receiving method has been proposed.

In this polarization wave diversity receiving method, two polarized wa components combined. Accordingly, in this method of combining intermediate frequencies, a method of combining basebands is considered.

The intermediate frequency combining method is a method in which the phases of two polarization wave components are previously made to coincide and are then combined by adding. The base band combining method is a method in which the two polarization wave components are demodulated and then combined by adding the two components together. In the intermediate frequency combining method, the matching of the phases is difficult, thus the realization thereof is difficult. Whereas, in the baseband combining method, although two detection circuits are necessary, the realization thereof is easy.

2. Description of the Related Art

In a conventional coherent optical communication system, a polarization wave diversity receiving system is preferably employed to overcome the signal fading caused by the fluctuation of the state of the polarization wave. To realize the polarization wave diversity receiving system, the above-mentioned baseband combining method is conventionally and preferably employed. In the conventional baseband combined method, two polarized components of intermediate frequency signals are simply combined and the combined signal is fed back to control a local oscillating circuit.

Since the phases of the intermediate frequency signals, however, do not always match each other, the power of the combined signal may often become zero.

If the power of the combined signal becomes zero, control of the local oscillating circuit is impossible. So, in the conventional baseband combining system, the stabilization of the intermediate frequency cannot always be guaranteed.

SUMMARY OF THE INVENTION

The present invention, solves the above-mentioned problems. An object of the present invention is to provide a polarization diversity optical receiver for coherent optical communication in which a baseband combining method is utilized and an intermediate frequency signal for stabilizing an optical local oscillating circuit can be obtained regardless of the phase difference and the amplitude ratio of the optical detected signals.

To attain the above object, there is provided, according to the present invention, a polarized wave diversity optical receiver for coherent optical communication comprising: an optical local oscillating circuit for oscillating local oscillating light; a mixing circuit for receiving signal light transmitted through an optical fiber and the local oscillating light from the optical local oscillating circuit, and for obtaining two polarized components; a detecting circuit for detecting the signals of the respective polarized components from the mixing circuit to output intermediate frequency signals; and a frequency control circuit for controlling, in accordance with the intermediate frequency signals of the respective polarized components from the detecting circuit, the oscillating frequency of the optical local oscillating circuit. The frequency control circuit comprises a unit for obtaining an output signal which is a combined signal of a sum and a difference of the intermediate frequency signals.

In place of the frequency control circuit, in the above-mentioned polarized wave diversity optical receiver, there may be provided, according to another aspect of the present invention, a local oscillating optical phase modulating unit for modulating either one of the polarized components of the local oscillating light from the optical local oscillating circuit.

In place of the frequency control circuit in the above-mentioned polarized optical receiver, there may also be provided, according to still another aspect of the present invention, a detected output signal modulating unit for modulating either one of the detected outputs of the respective polarized wave components from the detecting circuit.

BRIEF DESCRIPTION OF THE DRAWINGS

FIGS. 3A to 3C are waveform diagrams explaining the function of the unit shown in FIG. 2;

FIGS. 4 to 7 are principal block diagrams of the present invention;

FIG. 8 is a block diagram showing a first embodiment of the present invention;

FIGS. 9A to 9D and FIGS. 10A to 10D are waveform diagrams for explaining the function of the first embodiment of the present invention;

Figure 16:
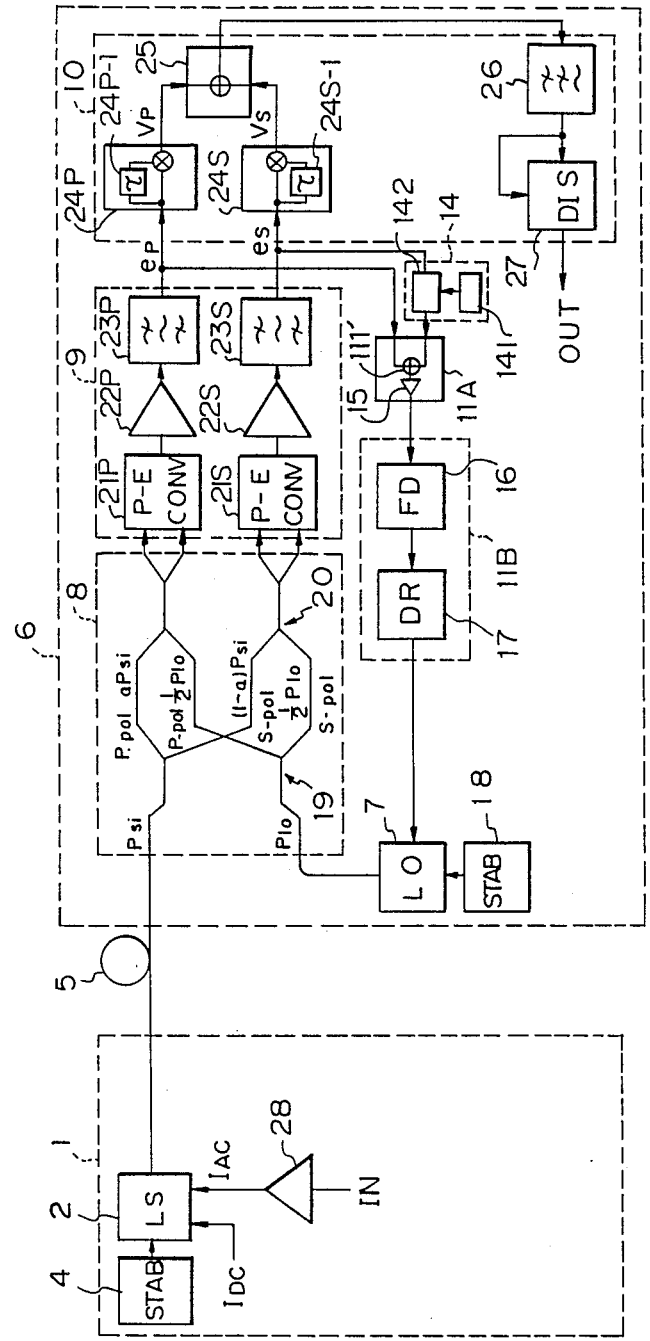
Figure 17:
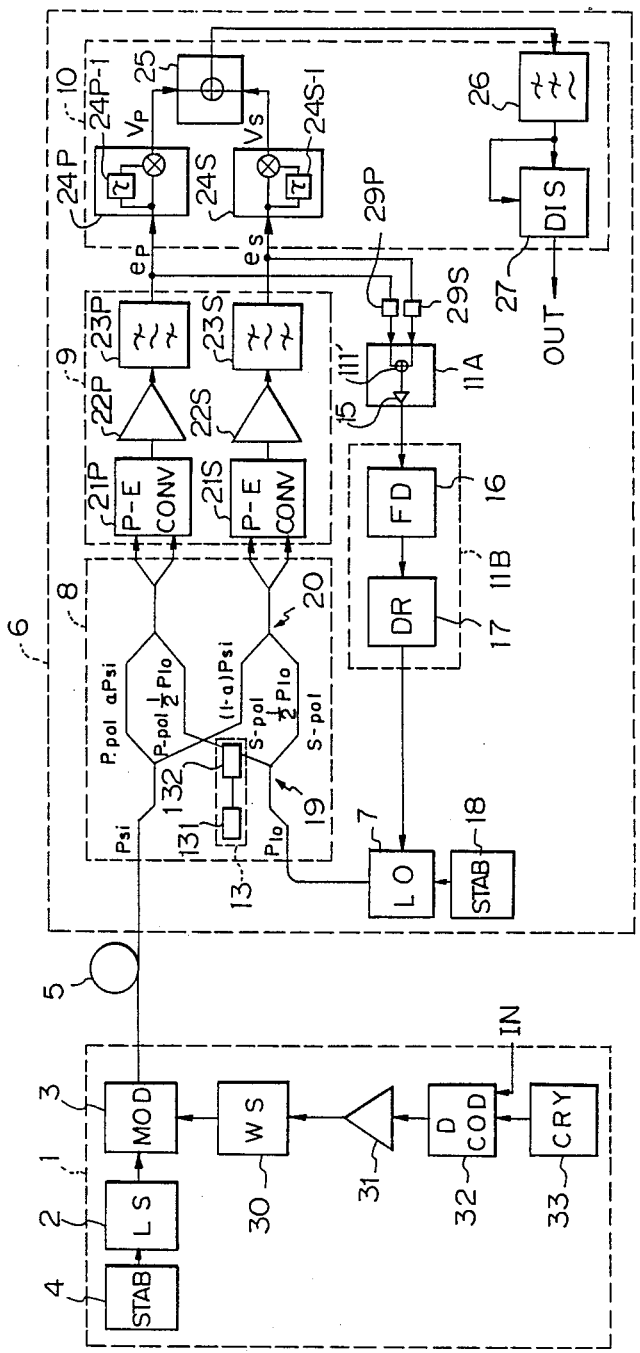
Figure 18:
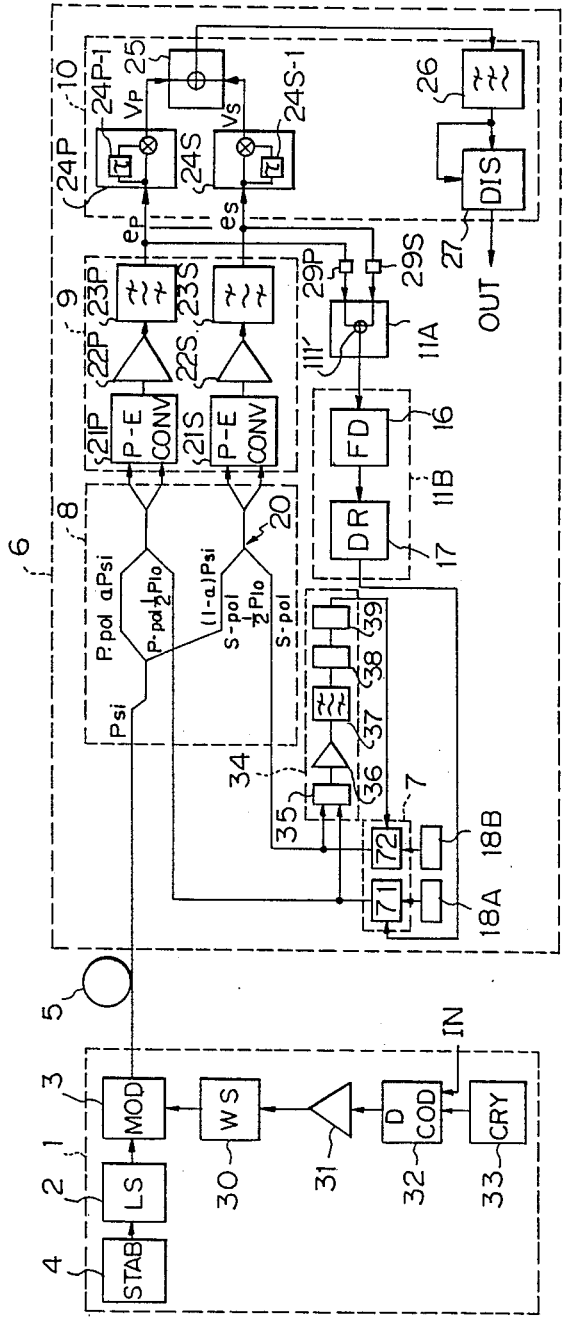
Figure 19:
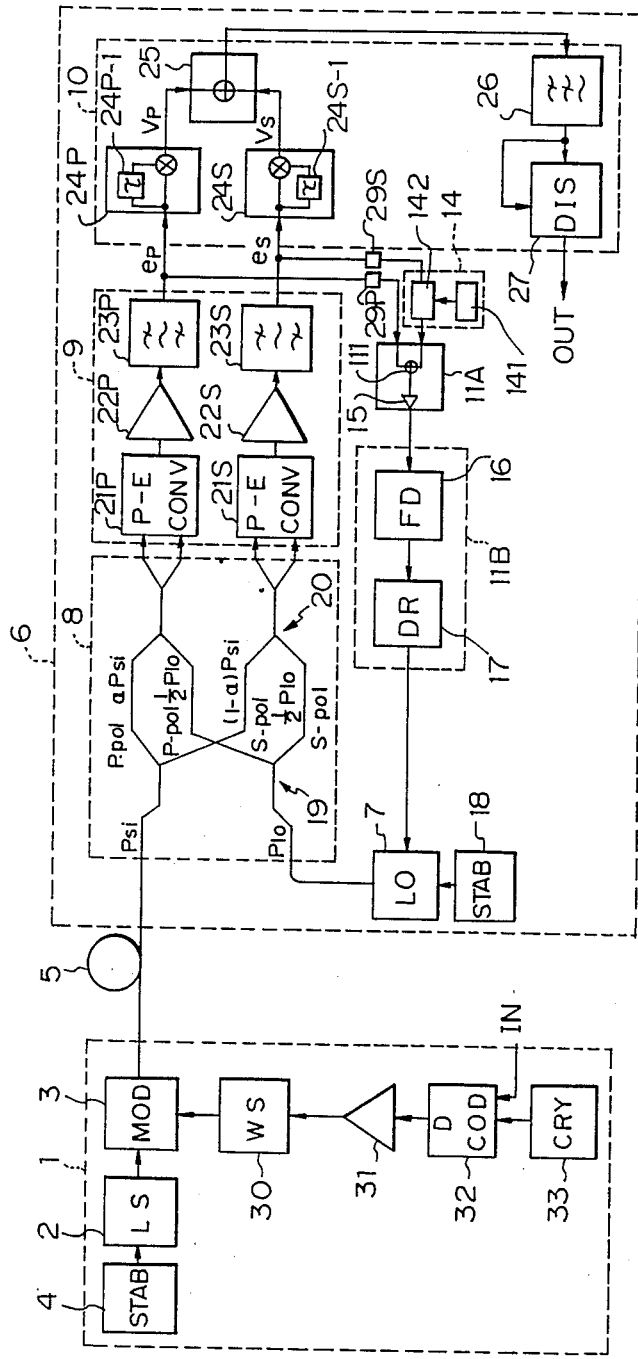

FIG, 15 is a block diagram showing a sixth embodiment of the present invention;

FIG. 16 is a block diagram showing a seventh embodiment of the present invention;

FIG. 17 is a block diagram showing an eighth embodiment of the present invention;

FIG. 18 is a block diagram showing a ninth embodiment of the present invention;

FIG. 19 is a block diagram showing a tenth embodiment of the present invention; and FIG. 20 is a block diagram showing a modification of the first embodiment of the present invention.

DESCRIPTION OF THE PREFERRED EMBODIMENTS

Figure 1:
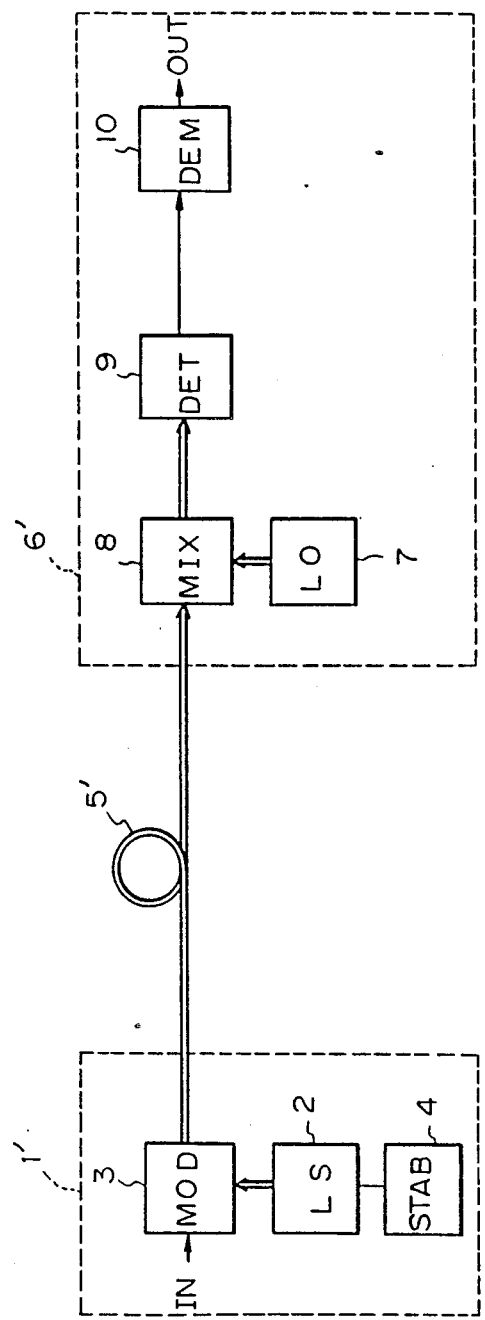
FIG. 1 is a block diagram showing a conventional coherent light communication system.

For better understanding of the present invention, conventional coherent optical communication will first be described with reference to FIGS. 1, 2, and 3A and 3C. FIG. 1 is a block diagram illustrating a conventional coherent optical communication system. In FIG. 1, 1' denotes a transmitter having a light source (LS) 2, an optical modulation circuit (MOD) 3, and a light source stabilizing unit (STAB) 4.

A semiconductor laser, for example, capable of effecting single mode oscillating, is used as the light source 2. When the semiconductor laser is used as mentioned above, the light source stabilizing unit 4 is provided with a temperature control unit for controlling the laser temperature to a constant value. Further, the optical modulation unit 3 is able to effect FSK (frequency shift keying) modulation, ASK (amplitude shift keying) modulation, and PSK (phase shift keying) or DPSK (differential phase shift keying) modulation of the input signal.

Reference 5' denotes an optical fiber used as the transmission medium and, for example, is usually a single, mode optical fiber. Reference 6' denotes a receiver which comprises an optical local oscillating circuit 7, a mixing circuit 8 for mixing the optical signal transmitted through the optical fiber 5' with the local oscillating light from the optical local oscillating circuit 7, a detection circuit 9 for detecting the mixed output of the mixing circuit 8, and a demodulating/discriminating circuit 10 for obtaining a signal corresponding to the above-mentioned input signal from the detected output of the detecting circuit 9.

A semiconductor laser is also used as the optical local oscillating circuit 7. The optical local oscillating circuit 7 is also maintained at a constant temperature by a temperature control circuit, so that the unit is stabilized.

In principle, this construction allows coherent optical communication to be conducted. One problem arising when realizing such coherent optical communication is the above-mentioned fluctuation of the polarized state, and preferably, a polarization diversity receiving system is employed as a counter-measure thereto. Further, when realizing the polarization diversity receiving system, preferably the baseband combining method is utilized as mentioned before.

Figure 2:
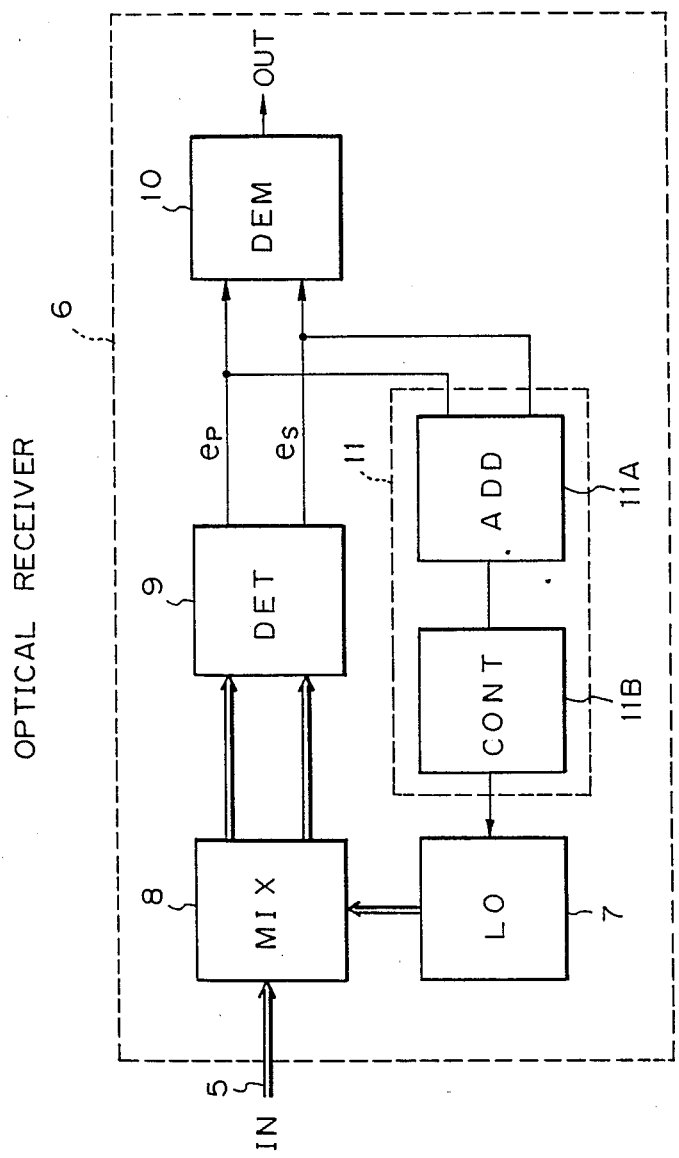
FIG. 2 is a block diagram showing an example of a conventional coherent light communication polarization diversity light receiver.

FIG. 2 is a block diagram of the polarization diversity optical receiver in which the polarization diversity optical receiving method utilizing the baseband combining method is used.

In FIG. 2, 6 denotes a polarization diversity optical receiver comprising an optical local oscillating circuit 7 for oscillating a local oscillating light, a mixing circuit 8 for mixing the two types of polarized components of the signal light transmitted through an optical fiber 5 with the local oscillation light from the optical local oscillating circuit 7, a detecting circuit 9 for detecting the signals of the respective polarized components from the mixing circuit 8, a demodulating-adding-discriminating circuit 10 for taking out the signals corresponding to the transmitted input signal from the detected output of the detecting circuit 9, and an automatic frequency control (AFC) circuit 11 for controlling oscillating signals of the local oscillating circuit 7 in accordance with the intermediate frequency signals $e_P$ and $e_S$ of the respective polarized components from the detecting circuit 9.

The automatic frequency control circuit 11 comprises an adding circuit 11A for adding the intermediate frequency signals (detected signals) $e_S$ and $e_P$ of the respective polarized components from the detected circuit 9, and a control circuit 11B for controlling the oscillating frequency of the optical local oscillating circuit 7 in accordance with the output of the adding circuit 11A.

The control circuit 11B comprises a frequency discriminating circuit for discriminating the frequency of the signal obtained by the adding circuit 11A, to output the corresponding voltage signal, and a drive circuit for converting the output of the frequency discriminating circuit into an electric current signal and input same to an oscillating frequency control input of the optical local oscillating circuit 7. Thus, the intermediate frequency is stabilized by feeding back the detected output information as shown above.

In a conventional polarization diversity optical receiver utilizing the baseband combining method as shown in FIG. 2, however, the phases of the two intermediate frequency signals $e_S$ and $e_P$ are not matched. Therefore, if added as they are, the control signal (the intermediate frequency signal for the AFC) applied to the optical local oscillating circuit 7 may be, in some cases, zero, so that the frequency discriminating circuit will not operate.

Namely, when a heterodyne-type coherent optical communication system of FSK (or ASK) is considered, the above-mentioned detected outputs (intermediate frequency signals) $e_S$ and $e_P$ can be expressed as follows:

$$e_P = (a)^{\frac{1}{2}} S(t) \cos(wt) \quad (1)$$

$$e_S = (1-a)^{\frac{1}{2}} S(t) \cos(wt + \theta) \quad (2)$$

wherein a=(signal emitted light power)/(total signal emitted power), $S(t) = S_0 m(t)$ where m(t)=0 (in case of space) and m(t)=1 (in case of mark), and $\theta$ is a phase difference due to polarization. When both are combined as they are, the output signal e(t) is $$\begin{aligned} e(t) &= e_P(t) + e_S(t) \\ &= S(t)\{(a)^{\frac{1}{2}}\cos(wt) + (1-a)^{\frac{1}{2}}\cos(wt+\theta)\} \end{aligned} \quad (3)$$

When the worst case ($a=\frac{1}{2}$, $\theta=\pi$) is considered, e(t)=0 will be obtained, and accordingly, the intermediate frequency signal for the AFC can not be obtained. This situation is illustrated in FIGS. 3A to 3C.

FIGS. 3A and 3B are examples of the waveforms of the intermediate frequencies $e_S$ and $e_P$, respectively, and FIG. 3C is an example of the combined waveform.

Next, when a heterodyne-type coherent optical communication system having PSK (or DPSK: differential phase shift keying) is considered, the above-mentioned detected outputs (intermediate frequency signals) $e_S$ and $e_P$ can be expressed as follows:

$$e_P = (a)^{\frac{1}{2}} S_0 \cos(wt + \phi(t)) \quad (4)$$

$$e_S = (1-a)^{\frac{1}{2}} S_0 \cos(wt + \phi(t) + \theta) \quad (5)$$

wherein $\phi(t)$ is $\pi m(t)$ (wherein m(t)=0 (in case of space) or 1 (in case of mark)), and when both are combined as they are, the output signal e(t) is $$e(t) = e_P(t) + e_S(t) \quad (6)$$
$$= S_0\{(a)^{\frac{1}{2}}\cos(wt + \phi(t)) + (1 - a)^{\frac{1}{2}}\cos - (wt + \phi(t) + \theta)\}$$

When the worst case ($a=\frac{1}{2}$, $\theta=\pi$) is considered, e(t)=0 will be obtained, and accordingly, the intermediate frequency signal for the AFC cannot be obtained, as in the case of the heterodyne type coherent optical communication system having FSK (or ASK).

FIGS. 4 to 7 are principal block diagrams of the present invention, where the same symbols represent substantially the same or similar parts throughout. A polarization diversity optical receiver 6 shown in FIG. 4 comprises an optical local oscillating circuit 7, a mixing circuit 8, a detecting circuit 9, a demodulating-adding-discriminating circuit 10, and an automatic frequency control circuit 11.

The optical local oscillating circuit 7 is used for oscillating a local oscillating light. The optical mixing circuit 8 is used for mixing the two types of polarized components of the signal light transmitted through the optical fiber 5 with the local oscillating light from the optical local oscillating circuit 7. The detecting circuit 9 is used for detecting the signals of the polarized components from the mixing circuit 8. The demodulating-adding-discriminating circuit 10 is used to obtain a signal corresponding to the transmitted input signal from the detected output of the detecting circuit 9. Further, the automatic frequency control circuit 11 is used for controlling the oscillating frequency of the optical local oscillating circuit 7 in accordance with the intermediate frequency signals $e_S$ and $e_P$ of respective polarized components from the detecting circuit 9.

The automatic frequency control circuit 11 comprises a first adder 111 for taking a sum of the intermediate frequency signals $e_S$ and $e_P$, a subtracter 112 for taking a difference of the intermediate frequency signals $e_S$ and $e_P$, a first frequency discriminating circuit 113 for discriminating a frequency with respect to the outputs from the first adder 111, a second frequency discriminating circuit 114 for discriminating a frequency with respect to the outputs from the subtracter 112, and a second adder 115 for adding the output from the first frequency discriminator 113 and the output from the second frequency discriminating 114. The automatic frequency control circuit 11 also comprises power dividers 116 and 117 for inputting the intermediate frequency signals of the respective polarized components from the detecting circuit 9 to the first adder 111 and the subtracter 112, and automatic gain control circuits 118 and 119 for adjusting the output gain from the first adder 111 and the subtracter 112. Furthermore, the automatic frequency control circuit 11 comprises a driver circuit 120 for converting the output of the second adder 115 to an electric current signal and inputting same to the oscillating frequency control input of the optical local oscillating circuit 120.

Figure 4:
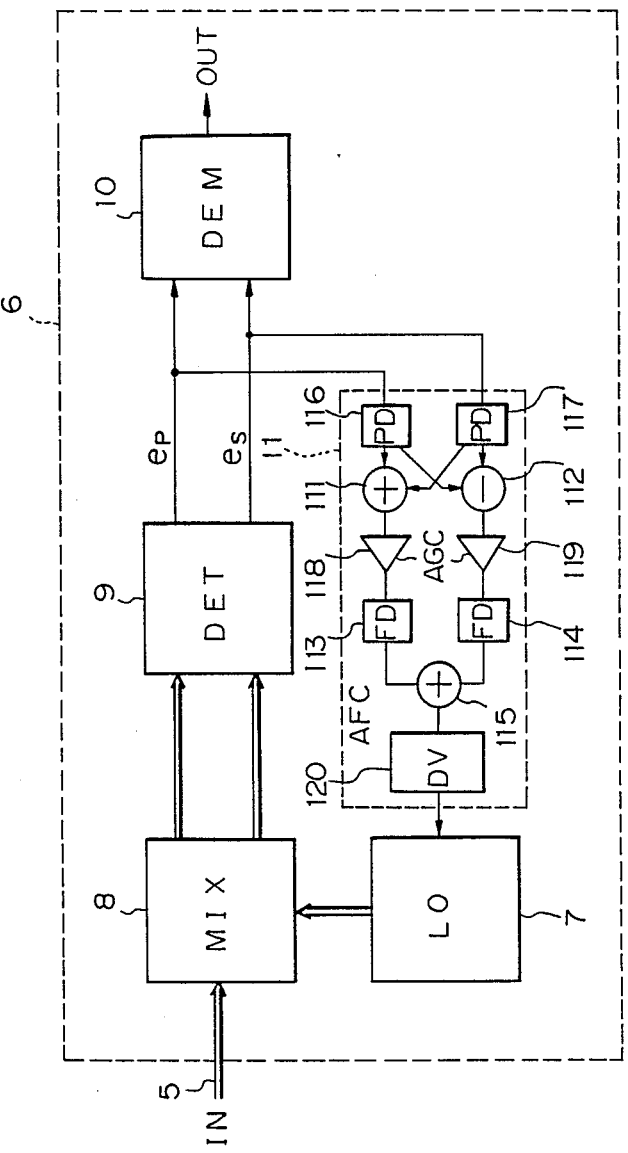
Figure 5:
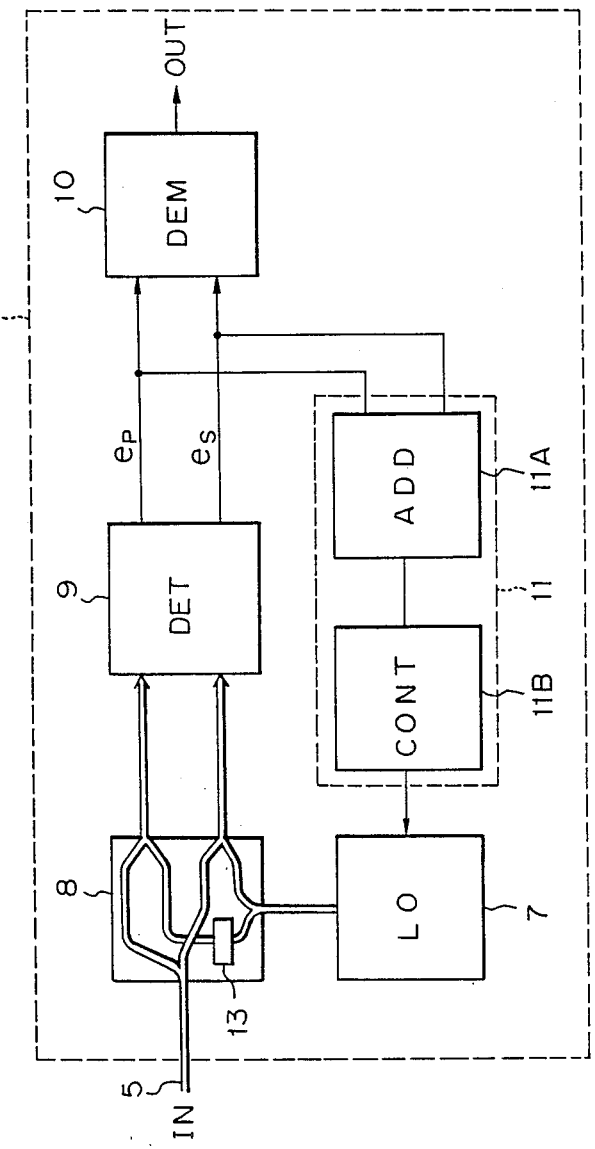

The polarization diversity optical receiver 6 shown in FIG. 5 comprises an optical local oscillating circuit 7, a mixing circuit 8, a detecting circuit 9, a demodulating-adding-discriminating circuit 10, an automatic frequency control circuit 11, and a local oscillating optical phase modulation unit 13. The mixing circuit 8 and the automatic frequency control circuit 11 of the polarization diversity optical receiver 6 shown in FIG. 5 are different from those of the polarization diversity optical receiver shown in FIG. 4. Namely, the mixing circuit 8 in FIG. 5 is used for dividing the signal light transmitted through the optical fiber 5 and the local oscillating light from the optical local oscillating circuit 7 into two types of polarized components respectively, and for mixing the respective polarized components. A local oscillating optical phase modulation unit 13 is provided in the mixing circuit 8, and is used for modulating the phase of one of the polarized components divided from the local oscillating light from the optical local oscillating circuit 7. Note that this includes shifting the phase of one of the divided polarized components with respect to the phase of the other polarized components. Note that the automatic frequency control circuit 11 is provided, as in FIG. 2, with the adding circuit 11A and the control circuit 11B.

Figure 6:
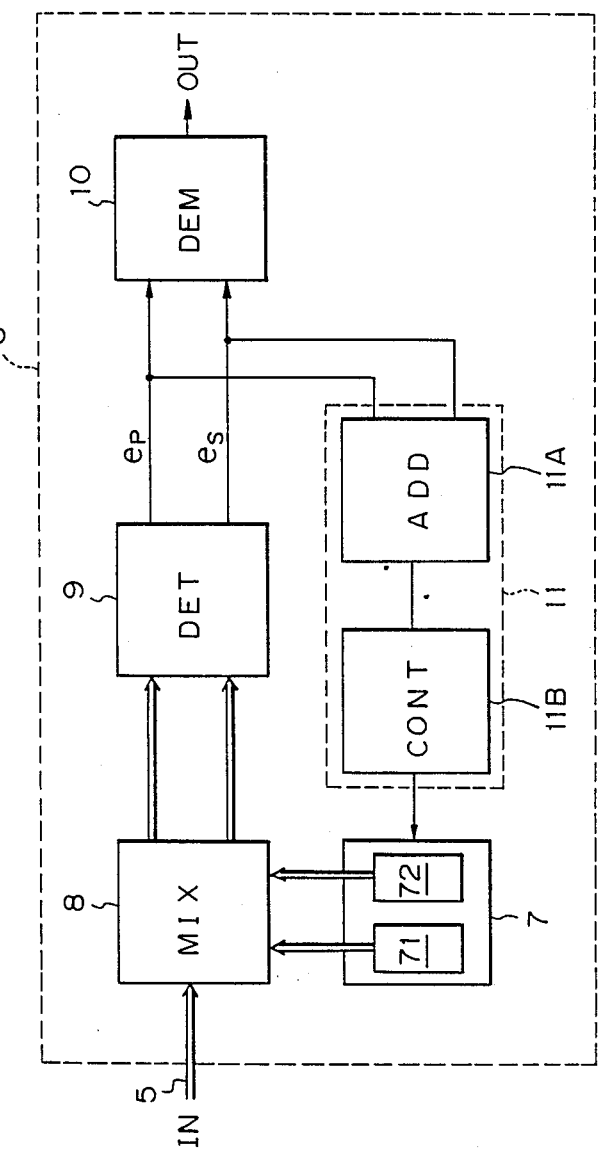

The polarization diversity optical receiver 6 shown in FIG. 6 also comprises an optical local oscillating circuit 7, a mixing circuit 8, a detecting circuit 9, a demodulating-adding-discriminating circuit 10, an automatic frequency control circuit 11, and a local oscillating optical phase modulating unit. The local oscillating optical phase modulating unit is provided in the optical local oscillating circuit 7. Namely, the optical local oscillating circuit 7 in FIG. 6 comprises two semiconductor lasers 71 and 72 for outputting local oscillating lights having different polarization states with respect to each other, and further, it is constructed so that the output phase of one of the semiconductor lasers 71 and 72 is modulated or the output frequency of one of the semiconductor lasers 71 and 72 is shifted by a predetermined amount with respect to the other output frequency. Accordingly, in the local oscillating lights from the optical local oscillating circuit 7, the phase of one of the polarized components is modulated or the frequency of one polarized component is shifted by a predetermined amount with respect to the frequency of the other polarized component.

Further, the polarization diversity optical receiver 6 shown in FIG. 7 comprises an optical local oscillating circuit 7, a mixing circuit 8, a detecting circuit 9, a demodulating-adding-discriminating circuit 10, an automatic frequency control circuit 11, and a phase modulation unit 14. The local oscillating optical phase modulating unit 14 is used for modulating the phase of either of the detected outputs $e_S$ and $e_P$ of the respective polarized components from the detecting circuit 9. The local oscillating optical phase modulating unit 14 is provided to shift the frequency of one of the detected outputs by a predetermined amount with respect to the frequency of the other detected output. Alternatively, the phase modulating unit 14 may be replaced by a time delay circuit for delaying one of the detected outputs by a predetermined time with respect to the other detected output.

Due to the above construction of the polarization diversity optical receiver 6 shown in FIG. 4, when the intermediate frequency signals $e_S$ and $e_P$ are fed back, the sum of these intermediate frequency signals $e_S$ and $e_P$ is output from the adder 111 and the difference between these intermediate frequency signals $e_S$ and $e_P$ is output from the subtracter 112. Then, with respect to the sum signal $e_S+e_P$ and the difference signal $e_S-e_P$, the frequencies are discriminated by the frequency discriminating circuit 113 and 114, respectively, and further, the outputs after the frequency discrimination are added and combined.

Accordingly, neither the sum nor the difference of the intermediate frequency signals $e_S$ and $e_P$ is made zero, and thus the combined signal is not made zero. Therefore, at least one of the frequency discriminating circuits 113, 114 can be operated. Thus the intermediate frequency signal for stabilizing the optical local frequency oscillating circuit 7 can be always obtained.

Also, in the polarization diversity optical receiver 6 shown in FIG. 5, the local oscillation optical phase modulating unit 13 modulates one of the divided polarized components of the local oscillating light from the optical local oscillating circuit 7. Accordingly, the interrelationship between the detected output signals is reduced, and thus the combined signal is not made zero, resulting in stabilization of the intermediate frequency.

Further, in the polarization diversity optical receiver 6 shown in FIG. 6, the local oscillating lights from the two semiconductor lasers 71 and 72 in the optical local oscillating circuit 7 have different polarized states. Namely one of the output phases of the semiconductor lasers 71 and 72 is modulated, or one of the output frequencies of semiconductor lasers 71 and 72 is shifted by a predetermined amount with respect to the other of the output frequencies. Therefore, it is possible to modulate one of the phases of the polarized components of the local oscillating light from the optical local oscillating circuit 7 or to shift the frequency of one of the polarized components with respect to the frequency of the other polarized component by a predetermined amount, so that the interrelationship between both detected output signals is reduced and the combined signal is not made zero, thus enabling a similar stabilization of the intermediate frequency.

Still further, in the polarization diversity optical receiver 6 shown in FIG. 7, since a phase modulation of either of the phases of the detected outputs $e_S$ and $e_P$ of the respective polarization components from the detection circuit 9 can be effected, the interrelationship between the detected output signals is reduced and the combined signal is not made zero, thus enabling a similar stabilization of the intermediate frequency. The same effects can be obtained when a frequency modulation or a delay is effected on either of the detected outputs $e_S$ and $e_P$.

Embodiments of the present invention will be described as follows, with reference to the drawings.

(a) Description of the First Embodiment

FIG. 8 is a block diagram showing the first embodiment, and illustrates a heterodyne-type coherent optical communication system having FSK (or ASK).

As shown in FIG. 8, 6 denotes a polarization diversity optical receiver as a receiver. The polarization diversity optical receiver 6 comprises an automatic frequency control circuit 11 in addition to the optical local oscillating circuit 7, the mixing circuit 8, the detecting circuit 9, and the decoding-adding-discriminating circuit 10.

The optical local oscillating circuit 7 is used for oscillating local oscillating light $P_{l0}$, and uses semiconductor lasers. The laser temperature is maintained at a constant value by a light source stabilizing unit 18 operating as a temperature control unit.

The mixing circuit 8 is used for mixing the two polarized components of the signal light Psi transmitted through the optical fiber 5 with the local oscillating light $P_{l0}$ form the optical local oscillating circuit 7, respectively. The mixing circuit 8 comprises a polarized wave separation optical fiber coupler 19 for separating the waves of the signal light Psi from the optical fiber 5 and the local oscillating light $P_{l0}$ from the optical local oscillating circuit 7, and a polarization maintaining optical fiber coupler 20 for maintaining the polarized state.

The power distribution to the P polarized component of the signal light Psi is (a) Psi and the power distribution to the S polarized component of the signal light Psi is (1−a) Psi. The power distribution to the P polarized component of the local oscillating light $P_{l0}$ is $\frac{1}{2}$ $P_{l0}$, and the power distribution to the S polarized component of the local oscillating light signal light $P_{l0}$ is $\frac{1}{2}$ $P_{l0}$. Note that (a) represents (signal emitting light power)/(total signal emitting light power of the P polarized component).

The detecting circuit 9 is used for detecting the signals of the respective polarized components from the mixing circuit 3, and comprises light-electricity converting circuits 21P and 21S, constructed as double-balanced optical receivers, post amplifiers 22P and 22S, and bandpass filters 23P and 23S. The light electricity converting, circuits 21P and 21S receive light, signals and convert the same into electric signals. The post amplifiers 22P and 22S amplify the electric outputs from the light-electricity converting circuits 21P and 21S. The bandpass filters 23P and 23S filter only a desired frequency band and output the intermediate frequency signals $e_S$ and $e_P$.

The demodulating-adding-discriminating circuit 10 is provided with a demodulating function for taking out a signal corresponding to the signal transmitted from the detected outputs (intermediate frequency signals) $e_S$ and $e_P$ of the detection circuit 9. The circuit 10 comprises delay detection circuits 24P and 24S, an adding circuit 25, a low pass filter 26, and a discriminating circuit 27.

The delay detecting circuits 24P and 24S comprise delay circuits 24P-1 and 24S-1 and the delay times in the respective delay circuit 24P-1 and 24S-1 are set to be nearly the same in the case of FSK (ASK). The adding circuit 25 is used for combining by adding the outputs Vp and Vs of the respective delay detecting circuits 24P and 24S. The low pass filter 26 is used for eliminating unnecessary band noise. The discriminating circuit 27 is used for discriminating "0" and "1" data from the signal, to output a signal corresponding to the transmitted input signal. Note that the discriminating circuit 27 is able to extract timing signals for discriminating "0" and "1" from the input signals.

The automatic frequency control circuit 11 is used for controlling the oscillating frequency of the optical local oscillating circuit 7 based on the intermediate frequency signals $e_S$ and $e_P$ of respective polarized components from the detecting circuit 9. The automatic frequency control circuit 11 comprises a first adder 111 for taking a sum of the intermediate frequency signals $e_s$ and $e_P$, a subtracter 112 for taking a difference of the intermediate frequency signals $e_S$ and $e_P$, a first frequency discriminating circuit 113 for discriminating a frequency with respect to the outputs from the first adder 111, a second frequency discriminating circuit 114 for discriminating a frequency with respect to the outputs from the subtracter 112, and a second adder 115 for adding the output from the first frequency discriminating 113 and the output from the second frequency discriminator 114. The automatic frequency control circuit 11 also comprises power dividers 116 and 117 for inputting the intermediate frequency signals of the respective polarized components from the detecting circuit 9 to the first adder 111 and the subtracter 112, and automatic gain control circuits 118 and 119 for adjusting the output gain from the first adder 111 and the subtracter 112. Moreover, the automatic frequency control circuit 11 further comprises a drive circuit 120 for converting the output of the second adder 115 to an electric current signal and inputting same to the oscillating frequency control input of the optical local oscillating circuit 7.

In FIG. 8, semiconductor lasers for example, by which single mode oscillations are possible, are used as the light source 2. Also, as the light source stabilizing unit 4, a unit having, for example, a temperature control unit for controlling the temperatures of the lasers to a constant value, is used. Further, the amplifier 28 is used for amplifying the input signal (data) and supplying the current signal $I_{AC}$ to a oscillating frequency control portion of the light source 2. A bias current $I_{DC}$ is also supplied to the oscillating frequency control portion of the light source 2.

Accordingly, optical modulation is carried out so that the ASK modulation (pulse amplitude modulation) or FSK modulation (pulse frequency modulation) can be effected. Also, in FIG. 8, reference 5 denotes the optical fiber used as a transmission medium.

According to the above constitution, when the intermediate frequency signals $e_S$ and $e_P$ are fed back, the power of each of the intermediate frequency signals $e_S$ and $e_P$ is divided into two parts which are input respectively to the first adder 111 and the subtracter 112. The sum data of the intermediate frequency signals $e_S$ and $e_P$ is output from the first adder 111 and the difference data of the intermediate frequency signals $e_S$ and $e_P$ is output from the subtracter 112. Then, the output gain is adjusted by the AGC circuits 118 and 119. Subsequently, with respect to the sum data $e_S + e_P$ and difference data $e_S - e_P$, the frequencies are discriminated by the frequency discriminating circuits 113 and 114. The respective outputs after the discrimination are added and combined by the second adder 115, and the resulting intermediate signal is input through the drive circuit 120 to the control input of the optical local oscillating circuit 7.

As a result, the sum and the difference of the intermediate frequency signals $e_S$ and $e_P$ are not made zero, and thus the combined signal is not made zero. Namely, as shown in FIGS. 9A and 9B, when the phase difference of the intermediate frequency signals $e_S$ and $e_P$ is zero, the difference of the intermediate frequency signals $e_S$ and $e_P$ is made zero as shown in FIG. 9C, but the sum of the intermediate frequency signals $e_S$ and $e_P$ is not made zero as shown in FIG. 9D. Also, when the phase difference of the intermediate frequency signals $e_S$ and $e_P$ is $\pi$, as shown in FIGS. 10A and 10B, the sum of the intermediate frequency signals $e_S$ and $e_P$ is made zero as shown in FIG. 10C, but the difference of the intermediate frequency signals $e_S$ and $e_P$ is not made zero, as shown in FIG. 10D. Therefore, either of the frequency discriminating circuits 114 and 113 can be operated, and the intermediate frequency signal for stabilizing the optical local oscillating circuit 7 can be always obtained.

Note that the gain adjusting ability of the AGC circuits 118 and 119 may be three times the gain adjusting ability usually available under an average power supply, when the mark ratio $m = \frac{1}{2}$. This value is usually sufficient in a standard AGC circuit.

Accordingly, an intermediate frequency signal having a desired frequency is obtained and the desired gain can be held. As a result, the desired stabilization of the oscillating frequency (intermediate frequency) of the optical local oscillating circuit 7 can be realized.

(b) Description of the Second Embodiment

Figure 11:
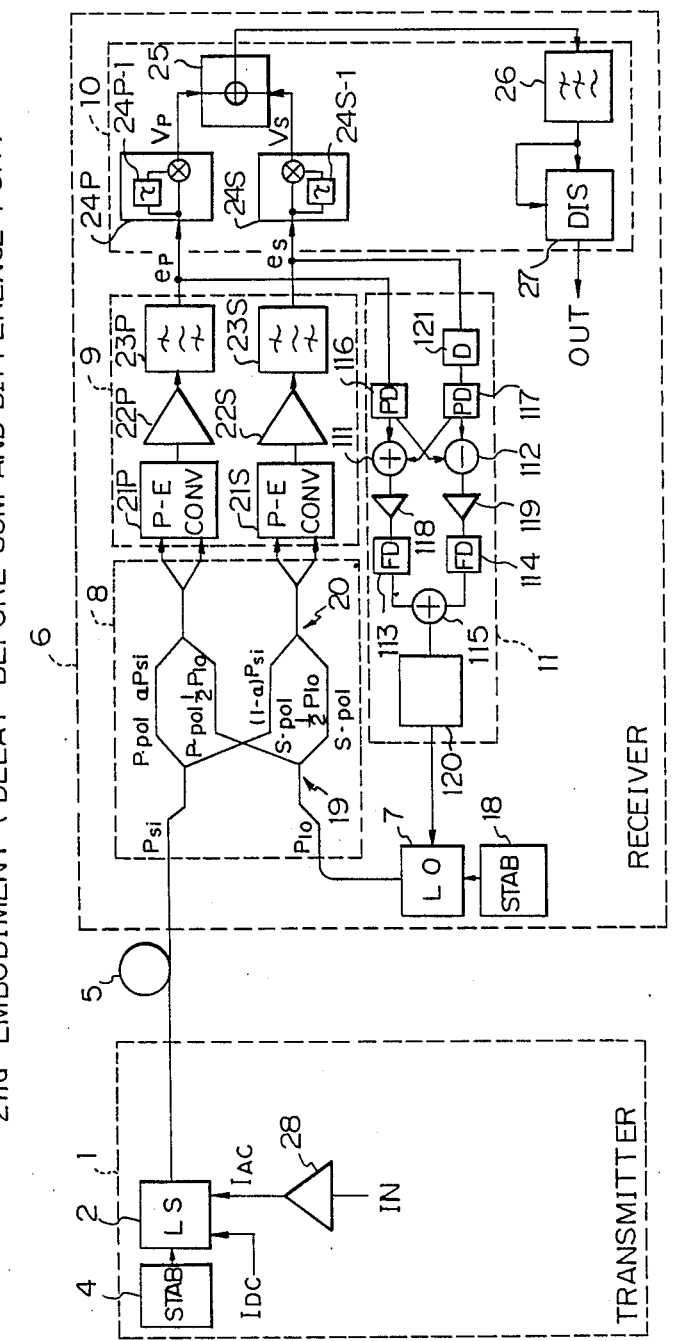
FIG. 11 is a block diagram showing a second embodiment of the present invention.

FIG. 11 shows a block diagram of the second embodiment of the present invention, and illustrates a heterodyne type coherent optical communication system having FSK (or ASK).

As shown in FIG. 11, the polarization diversity optical receiver 6 also comprises an automatic frequency control circuit 11 in addition to the optical local oscillating circuit 7, the mixing circuit 8, the detecting circuit 9, and the decoding-adding-discriminating circuit 10. The construction and the functions of the optical local oscillating circuit 7, the mixing circuit 8, the detecting circuit 9, and the decoding-adding-discriminating circuit 10 are the same as those of the first embodiment, and therefore, a detailed description thereof will be omitted.

In this second embodiment, the construction of the automatic frequency control circuit 11 is different from that of the first embodiment. Therefore, the components of the automatic frequency control circuit 11 are described as follows.

Namely, the automatic frequency control circuit 11 comprises a first adder 111 for taking a sum of the intermediate frequency signals $e_S$ and $e_P$, a subtracter 112 for taking a difference of the intermediate frequency signals $e_S$ and $e_P$, a first frequency discriminating circuit 113 for discriminating a frequency with respect to the outputs from the first adder 111, a second frequency discriminating circuit 114 for discriminating a frequency with respect to the outputs from the subtracter 112, and a second adder 115 for adding the output from the first frequency discriminator 113 and the output from the second frequency discriminator 114. The automatic frequency control circuit 11 also comprises power dividers 116 and 117 for inputting the intermediate frequency signals $e_S$ and $e_P$ of the respective polarized components from the detecting circuit 9 to the first adder 111 and the subtracter 112, and automatic gain control circuits 118 and 119 for adjusting the output gain from the first adder 111 and the subtracter 112. In addition, the automatic frequency control circuit 11 is provided with a delay circuit 121 for delaying either of the intermediate frequency signals $e_S$ and $e_P$ of the respective polarized components from the bandpass filters 23P and 23S by, for example, one bit, before inputting same to the first adder 111 and the subtracter 112.

As in the first embodiment, the automatic frequency control circuit 11 comprises a driver circuit 120 for converting the output of the second adder 115 to an electric current signal and for inputting same to the oscillating frequency control input of the optical local oscillating circuit 120.

In the second embodiment, when the intermediate frequency signals $e_S$ and $e_P$ are fed back, one of the intermediate frequency signals $e_S$ and $e_P$ i.e., $e_S$, is delayed, and the power of the delayed intermediate frequency signal $e_S$ and non-delayed intermediate frequency signal $e_P$ are respectively divided by the power dividers 16 and 117 and input to the first adder 111 and the subtracter 112, respectively. Subsequently, the sum data of the intermediate frequency signals $e_S$ and $e_P$ output from the first adder 111 and the difference data of the intermediate frequency signals $e_S$ and $e_P$, is output from the subtracter 112, and then the output gain is adjusted by the AGC circuits 118 and 119. Then the frequencies of these sum signals $e_S+e_P$ and the difference signal $e_S-e_P$ are discriminating by the frequency discriminating circuits 113 and 114. The respective outputs after the frequency discrimination are added and combined by the second adder 115, and the adder and combined intermediate frequency signal is input through a drive circuit 120 to the control input of the optical local oscillating circuit 7.

Thus, the interrelationship between the intermediate frequency signals $e_S$ and $e_P$ can be further reduced than in the first embodiment, and therefore, the sum and the difference of the intermediate frequency signals $e_S$ and $e_P$ are not made zero, and as a result, the combined signal is not made zero.

Since either of the frequency discriminating circuits 114 and 113 can be operated, the intermediate frequency signal for stabilizing the optical local oscillating circuit can be always obtained.

Note that the gain adjusting ability of the AGC circuits 118 and 119 is also sufficient for a standard AGC circuit as in the first embodiment. An intermediate frequency signal having a desired frequency can always be obtained and the desired gain can be maintained. Thus a required stabilization of the oscillating frequency (intermediate frequency) of the optical local oscillating circuit 7 can be obtained.

(c) Description of the Third Embodiment

Figure 12:
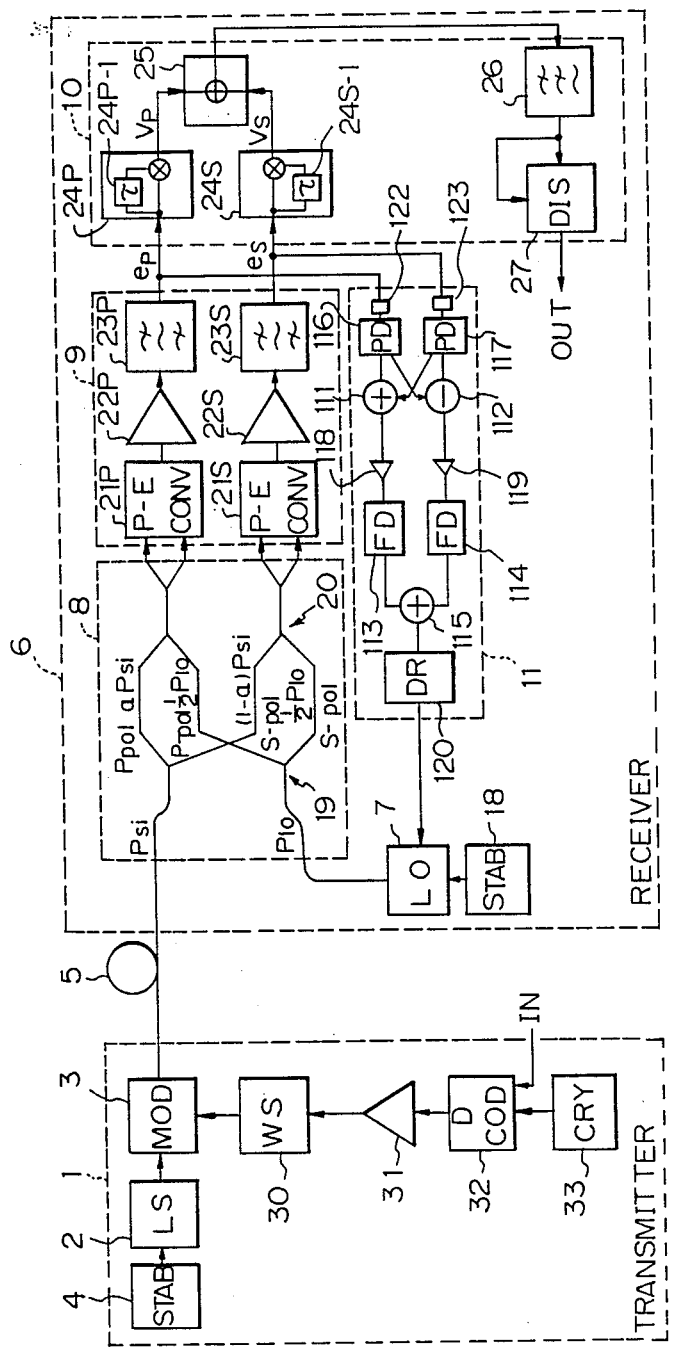
FIG. 12 is a block diagram showing a third embodiment of the present invention.

FIG. 12 is a block diagram showing a third embodiment of the present invention, and illustrates a heterodyne-type coherent optical communication system having DPSK.

As shown in FIG. 12, 6 denotes a polarization diversity optical receiver which comprises an automatic frequency control circuit 11, in addition to comprising the optical local oscillating circuit 7, the mixing circuit 8, the detecting circuit 9, and the demodulating-adding-discriminating circuit 10.

In this third embodiment, the construction of the automatic frequency control circuit 11 corresponds to that of the first embodiment, except for one portion thereof. Therefore, the components of the automatic frequency control circuit 11 will be described as follows.

The automatic frequency control circuit 11 comprises, as in the first embodiment, a first adder 111 for taking a sum of the intermediate frequency signals $e_S$ and $e_P$, a subtracter 112 for taking a difference of the intermediate frequency signals $e_S$ and $e_P$, a first frequency discrimination circuit 113 for discriminating a frequency of the outputs from the first adder 111, a second frequency discriminating circuit 114 for discriminating a frequency of the outputs from the subtracter 112, and a second adder 115 for adding the output from the first frequency discriminator 113 and the output from the second frequency discriminator 114. The automatic frequency control circuit 11 also comprises power dividers 116 and 117 for inputting the intermediate frequency signals $e_P$ and $e_S$ of the respective polarized components from the detecting circuit 9 to the first adder 111 and the subtracter 112, and AGC circuits 118 and 119 for adjusting the output gains from the first adder 111 and the subtracter 112. However, the third embodiment differs from the first embodiment in that the automatic frequency control circuit 11 comprises doublers 122 and 123 for doubling the respective output frequencies of the intermediate signals $e_P$ and $e_S$ before the addition and the subtraction thereof.

As mentioned above, the difference between the automatic frequency control circuit 11 of the first embodiment resides in the provision of the doublers, by which the expansion of the spectrum due to the phase information of the intermediate frequencies can be cancelled. Namely, the modulated signal is cancelled and only the doubled frequency components of the intermediate frequency signals are output.

Note that, as in the first embodiment, the automatic frequency control circuit 11 comprises a driver circuit 120 for converting the output of the second adder 115 to an electric current signal and inputting same to the oscillating frequency control input end of the optical local oscillating circuit 120. Also, the delay times in the delay circuits 24P-1 and 24S-1 in the delay detecting circuits 24P and 24S are set, in the case of DPSK, to one bit.

Note that, in FIG. 12, 1 denotes a transmitter for DPSK. The transmitter 1 comprises a light source 2, an optical modulation circuit 3, a light source stabilizing circuit 30, an amplifier 31, a differential coding circuit 32, and a crystal oscillator 33. As the light source 2, for example, semiconductor lasers capable of single mode oscillation are used. When the semiconductor lasers are used as mentioned above, a unit having, for example, a temperature control unit 4 for controlling the temperature of the lasers, is used.

Further, the differential coding circuit 32 is used for receiving a reference signal from the crystal oscillator 33 and an input signal (data) and for a differential coding of an output. The output of the differential coding circuit 32 is input through an amplifier 31 and the waveform shaping circuit 30 to the optical modulation circuit 3.

Accordingly, optical modulation is carried out so that DPSK modulation of the input signal can be effected. Note that 5 denoted an optical fiber as a transmitting medium.

In the third embodiment, when the intermediate frequency signals $e_P$ and $e_S$ are fed back, the expansion of the spectrum due to the phase information of the intermediate frequency signals is cancelled in the doublers 122 and 123, and the powers of the intermediate frequency signals $e_P$ and $e_S$ are divided into two parts by the power dividers 116 and 117, and input respectively to the first adder 111 and the subtracter 112. Subsequently, the sum data of the intermediate frequency signals $e_p$ and $e_S$ is output from the first adder 111 and the difference data of the intermediate frequency signals $e_P$ and $e_S$ is output from the output of the subtracter 112. Then, the output gains of these sum signal $e_S+e_P$ and difference signal $e_S-e_P$ are adjusted in the AGC circuits 118 and 119, and subsequently the frequencies of these sum signal $e_S+e_P$ and difference signal $e_S-e_P$ are discriminated by the frequency discriminating circuits 113 and 114. The respective outputs after the frequency discriminations are added and combined, and the resulting signal is input through the driving circuit 120 to the control input of the optical local oscillating circuit 7.

Accordingly, as in the first embodiment, the interrelationship between the intermediate frequency signals $e_S$ and $e_P$ can be reduced, and therefore, the sum and the difference of the intermediate frequency signals $e_S$ and $e_P$ are not made zero, and as a result, the combined, signal is not made zero. Thus since either of the frequency discriminating circuits 114 and 113 can be operated, the intermediate frequency signal for stabilizing the optical local oscillating circuit can be always obtained.

Note that the gain adjusting ability of the AGC circuits 118 and 119 is sufficient for a standard AGC circuit as in the first and the second embodiment, Thus an intermediate frequency signal having a desired frequency can always be obtained, and the desired gain can be held, so that the required stabilization of the oscillating frequency (intermediate frequency) of the optical local oscillating circuit 7 can be obtained, as in the first and second embodiments.

(d) Description of the Fourth Embodiment

Figure 13:
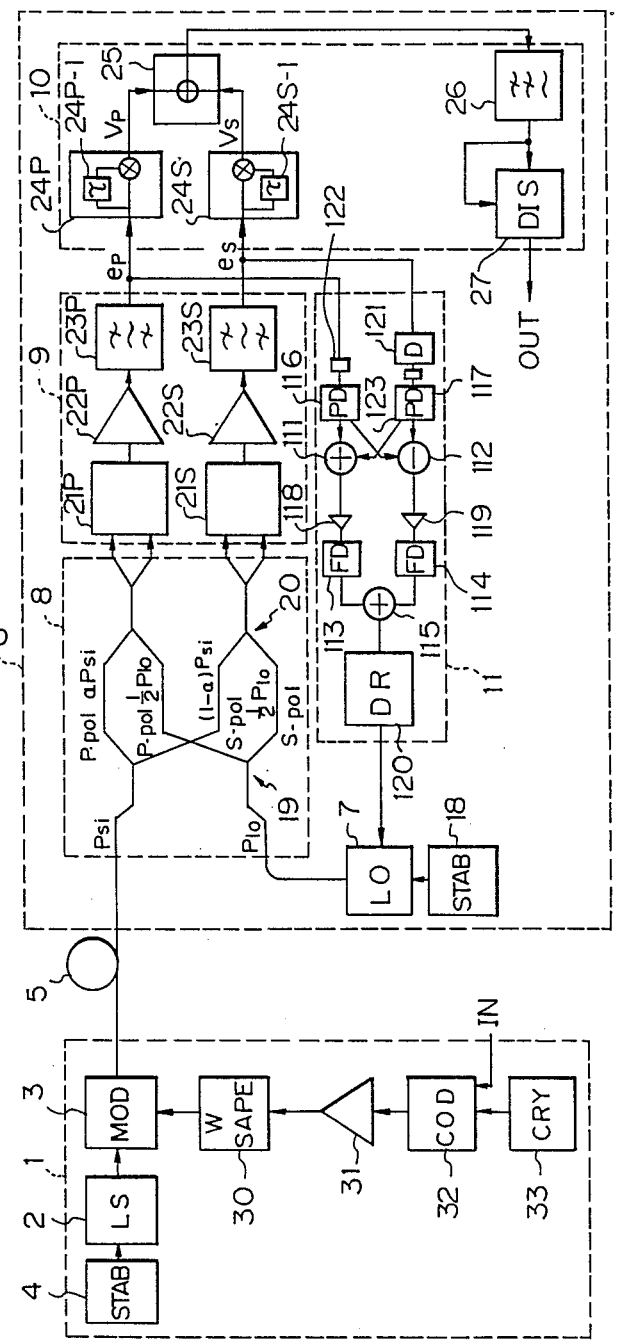
FIG. 13 is a block diagram showing a fourth embodiment of the present invention.

FIG. 13 is a block diagram showing a fourth embodiment of the present invention, and illustrates a heterodyne-type coherent optical communication system having DPSK.

The polarization diversity optical receiver 6 in FIG. 13 also comprises an automatic frequency control circuit 11, in addition to the optical local oscillating circuit 7, the mixing circuit 8, the detecting circuit 9, and the decoding-adding-discriminating circuit 10.

The optical local oscillating circuit 7, the mixing circuit 8, the detecting circuit 9, and the decoding-adding-discriminating circuit 10 are the same as those of the first, second, and third embodiments, and therefore, a detailed description thereof is omitted.

In the fourth embodiment, the components of the automatic frequency control circuit 11 corresponds to that of the second embodiment, except that it comprises doublers 122 and 123. The portion different from that in the above-mentioned third embodiment comprises a delay circuit 121 for delaying one of the intermediate frequency signals $e_P$ and $e_S$ of the respective polarized components from the bandpass filters 23P and 23S by, for example, one bit, before inputting same to the first adder 111 and the subtracter 112.

According to the fourth embodiment, the interrelationship between the intermediate frequency signals $e_P$ and $e_S$ can be further reduced than in the third embodiment, and thus the sum and the difference of the intermediate frequency signals $e_P$ and $e_S$ are not made zero, and therefore, the combined signal is not made zero. As a result, either of the frequency discriminating circuits 114 and 113 can be operated, and accordingly, the intermediate frequency signal for stabilizing the optical local oscillating circuit can always be obtained.

The gain adjusting ability of the AGC circuits 118 and 119 is also sufficient for a standard AGC circuit as in the first to third embodiments, and thus an intermediate frequency signal having a desired frequency can be always obtained, and therefore, the required stabilization of the oscillating frequency (intermediate frequency) of the optical local oscillating circuit 7 can be obtained.

(e) Description of the Fifth Embodiment

Figure 14:
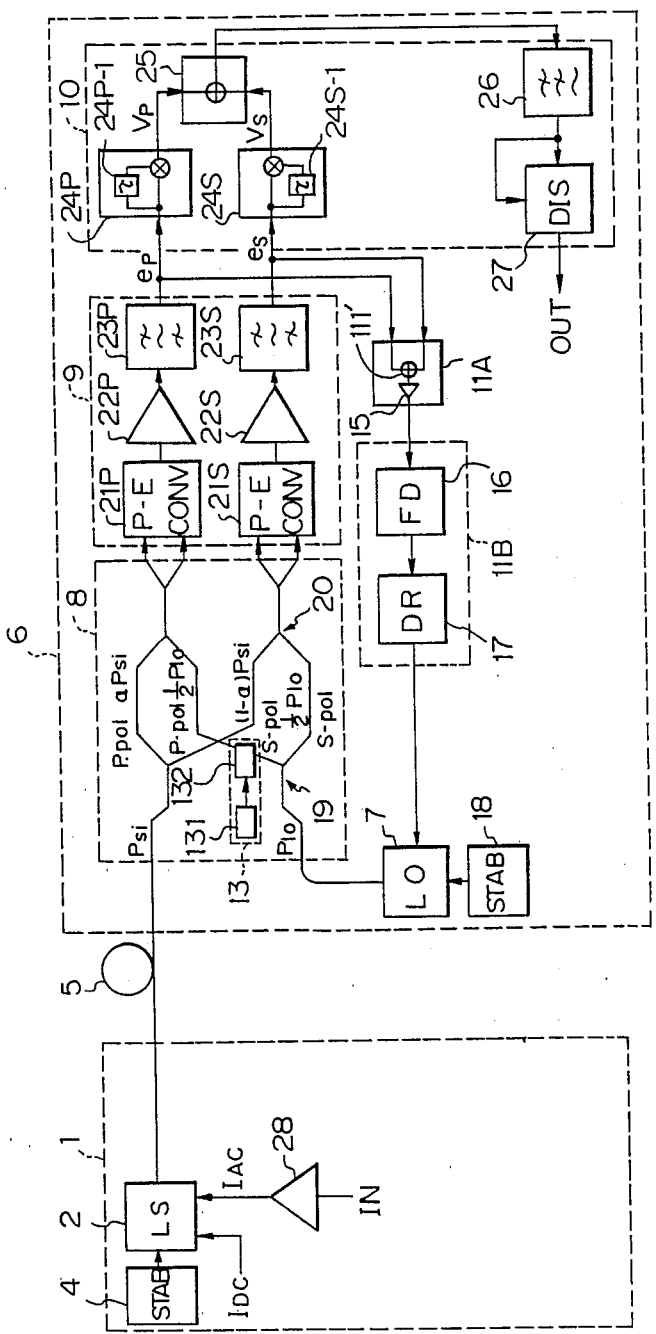
FIG. 14 is a block diagram showing a fifth embodiment of the present invention.

FIG. 14 is a block diagram showing a fifth embodiment of the present invention, and illustrates a heterodyne-type coherent optical communication system having FSK (or ASK).

The polarization diversity optical receiver 6 shown in FIG. 14 comprises, in addition to the optical local oscillating circuit 7, a mixing circuit 8, a detecting circuit 9, and a demodulating-adding-discriminating circuit 10, an adding circuit 11A and a control circuit 11B, which constitute an automatic frequency control circuit, and a local oscillating optical phase modulating unit 13.

The optical local oscillating circuit 7 provided with the light source stabilizing unit 18, the detecting circuit 9, and the demodulating-adding-discriminating circuit 10 are the same as in the first to fourth embodiments.

The mixing circuit 8 is used for mixing the two polarized components of the signal light Psi transmitted through the optical fiber 5 with the local oscillating light $P_{l0}$ from the optical local oscillating circuit 7, respectively. The mixing circuit 8 comprises a polarization wave separation optical fiber coupler 19 for separating the waves of the signal light Psi from the optical fiber 5 and the local oscillating light $P_{l0}$ from the optical local oscillating circuit 7, and a polarization maintaining optical fiber coupler 20 for maintaining the polarized state.

The power distribution to the P polarized component of the signal light Psi is aPsi, and the power distribution to the S polarized component of the signal light Psi is (1−a)Psi. The power distribution to the P polarized component of the local oscillating light $P_{l0}$ is $\frac{1}{2} P_{l0}$, and the power distribution to the S polarized component of the local oscillating light signal light $P_{l0}$ is $\frac{1}{2} P_{l0}$. Note that a denotes (signal emitting light power)/(total signal emitting light power of the P polarized component).

The local oscillating optical phase modulation unit 13 is used for modulating the phase of the polarized component of the local oscillating light from the optical local oscillating circuit 7. The modulating unit 13 comprises an oscillator 131 and a phase modulator 132 for modulating the phase of the polarized component (light signal) of the local oscillating light from the optical local oscillating circuit 7, by using the signal from the oscillator 131.

The adding circuit 11A is used for adding the detected outputs $e_S$ and $e_P$ of the respective polarized components from the bandpass filters 23P and 23S, and therefore comprises an adder 111′. The adding circuit 11A comprises an automatic gain control circuit (AGC circuit) 15 for adjusting the output gain after addition in the adder 111′.

Further, the control circuit 11B is used for controlling the oscillating frequency of the optical local oscillating circuit 7 based on the output from the adding circuit 11A. To this end, the control circuit 11B is constructed as an automatic frequency control circuit (AFC circuit) comprising a frequency discriminating circuit 16 for discriminating the frequency of the signal obtained by the adding circuit 11A to output the corresponding voltage output, and a drive circuit 17 for converting the output of the frequency discriminating circuit 16 into a current signal and inputting same to the oscillating frequency control input of the optical local oscillating circuit 7.

In the above construction, in the polarization diversity optical receiver 6 of this fifth embodiment, the phase of the split polarized component of the local oscillating light from the optical local oscillating circuit 7 is modulated by the local oscillating optical phase modulating unit 13, and accordingly, the phase difference between the detected output signals $e_S$ and $e_P$ can be changed from zero to $2\pi$ as a function of time. As a result, the interrelationship between the detected output signals $e_S$ and $e_P$ can be reduced. Therefore, the combined signal does not become zero and a desired intermediate frequency can be obtained for the AFC.

Note that the output gain after the addition is adjusted by the automatic gain control circuit (AGC circuit) 15. Preferably, the gain adjusting ability of the AGC circuit 15 is set to cover, for example, a threefold gain adjustment of the average power. When the mark ratio m=½, the threefold gain adjustment of the average power can be made by a standard AGC circuit 15.

Accordingly, an intermediate frequency signal having a desired frequency is obtained and the desired gain can be maintained. Thus the required stabilization of the oscillating frequency (intermediate frequency) of the optical local oscillating circuit 7 can be obtained.

Note that, as the local oscillating optical phase modulating unit 13, the unit for modulating the phase of the one polarized component (P or S) of the local oscillating light from the optical local oscillating circuit 7, can be replaced by the unit for shifting the frequency of the polarized component (P or S) of the local oscillating light from the optical local oscillating circuit 7 by a desired amount with respect to the other polarized component.

(f) Description of the Sixth Embodiment

Figure 15:
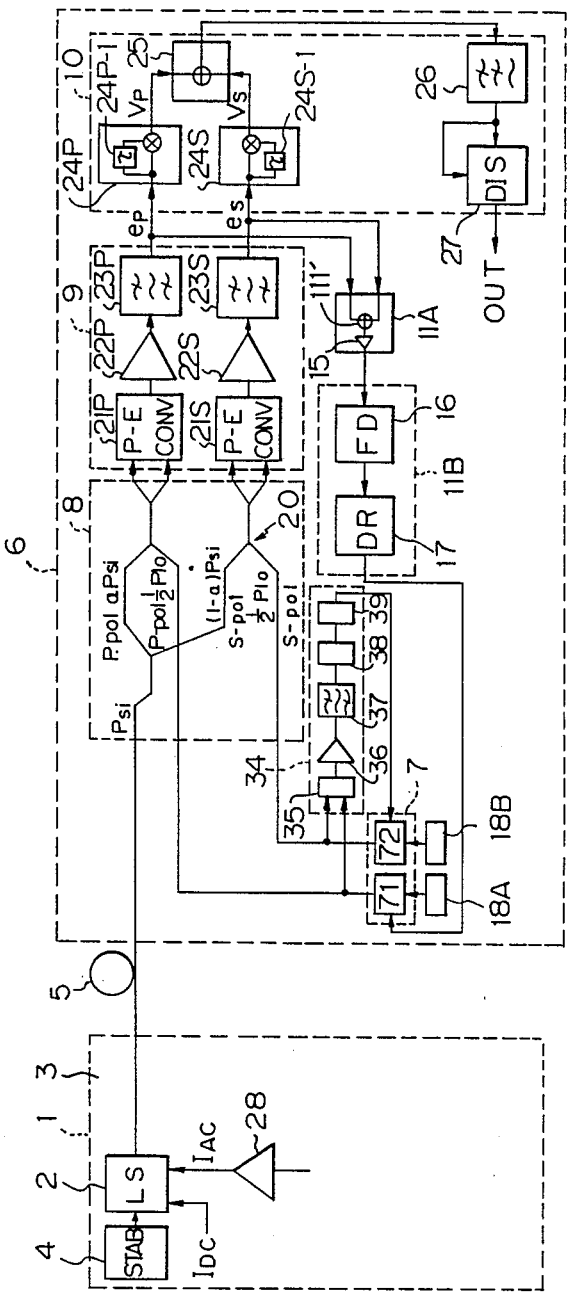

FIG. 15 is a block diagram showing the sixth embodiment of the present invention, and illustrates a heterodyne-type coherent optical communication system having FSK (or ASK).

The polarization diversity optical receiver 6 comprises, in addition to the optical local oscillating circuit 7, the mixing circuit 8, the detecting circuit 9, and the demodulating-adding-discriminating circuit 10, an adding circuit 11A and a control circuit 11B, as well as a local oscillating optical phase modulating unit for shifting the phase of the polarized component of the local oscillating light with respect to the phase of the other polarized component. The local oscillating optical phase modulation unit is provided in the optical local oscillating circuit 7. Namely, the optical oscillating circuit 7 comprises a first semiconductor laser 71 for outputting local oscillating light having the P polarized component, and a second semiconductor laser 72 for outputting local oscillating light having the S polarized component. The difference between the output frequencies of the respective semiconductor lasers 71 and 72 is locked to a desired value of, for example, several mega hertz when the frequency of the semiconductor laser 71 or 72 is on the order of $2\times10^4$ hertz, by the automatic frequency control circuit (AFC circuit) 34.

The AFC circuit 34 comprises a photo-electric converting circuit 35 constructed as a double-balanced optical receiver, a post amplifier 36, a bandpass filter 37, a frequency discriminating circuit 38, and a driver circuit 39. The photo-electric converting circuit 35 is used for receiving light signals from the respective semiconductor lasers 71 and 72 and converting same into electric signals. The post amplifier 36 is used for amplifying the electric output from the photo-electric converting circuit 35. The bandpass filter 37 is used for filtering and outputting only a desired frequency band. The frequency discriminating circuit 38 is used for discriminating the signals from the bandpass filter 37 and outputting the corresponding voltage signals. The drive circuit 39 is used for converting the output of the frequency discriminating circuit 38 and inputting the same to the oscillating frequency control input end of the optical local oscillating circuit 72.

Note that the respective semiconductor lasers 71 and 72 are controlled by the light source stabilizing units 18A and 18B, whereby the laser temperature is kept to a constant value. Also, the mixing circuit 8, the detecting circuit 9, the demodulating-adding-discriminating circuit 10, and the control circuit 11B are the same as in the fifth embodiment, and therefore, a descriptions thereof is omitted. In the above construction, in the polarization diversity optical receiver 6 shown in FIG. 15, since the respective local oscillating lights from the two semiconductor lasers 71 and 72 in the light local oscillating circuit 7 have different polarized states, and further, since the frequency difference of the local oscillating lights is shifted by a predetermined amount, the interrelationship between the detected output signals is reduced and thus the combined signal is not made zero, and therefore the intermediate frequency is stabilized.

Further, circuit for shifting the frequency of one output (polarized component P or S) of the semiconductor lasers 71 and 72 by a predetermined amount with respect to the frequency of the other output (polarized component S or P), can be replaced by a circuit for modulating the phase of one output (polarized component P or S) of the semiconductor lasers 71 and 72.

(g) Description of the Seventh Embodiment

FIG. 16 is a block diagram showing the seventh embodiment of the present invention, and illustrates a heterodyne type coherent optical communication system having FSK (or ASK).

The polarization diversity optical receiver 6 shown in FIG. 16 comprises, in addition to the optical local oscillating circuit 7, the mixing circuit 8, the detecting circuit 9, the demodulating-adding-discriminating circuit 10, the adding circuit 11A and the control circuit 11B, as well as a detected output phase modulating unit 14 for modulating the phase of either of the detected outputs $e_S$ and $e_P$ of the respective polarized components from the detecting circuit 9.

The detected output phase modulating unit 14 comprises an oscillator 141 and a phase modulator 142 for modulating, by the signal from the output of the oscillating circuit 141, the phase of one (electric signal) of the detected outputs $e_S$ and $e_P$ of the respective polarized components from the detecting circuit 9.

The optical local oscillating circuit 7, the mixing circuit 8, the detecting circuit 9, and the demodulating-adding-discriminating circuit 10, the adding circuit 11A, and the control circuit 11B are the same as in the fifth embodiment, and therefore, a detailed description thereof is omitted. Note that the local oscillating optical phase modulating unit 13 is not provided in the mixing circuit 8.

In the above construction, in the polarization diversity optical receiver 6, either of the detected outputs $e_S$ and $e_P$ of the respective polarized components from the detecting circuit 9 is modulated by the detected output phase modulating unit 14. Accordingly, the phase difference between, for example, the detected output signals $e_S$ and $e_P$, can be changed from 0 to $\pi$ as a function of time. As a result, the interrelationship between the detected output signals $e_S$ and $e_P$ can be reduced and thus the combined signal is not made zero. Therefore, a desired intermediate frequency signal for the AFC can be obtained whereby the stabilization of the intermediate frequency can be obtained in the same way as in the previous embodiments.

Note that, as the detected output phase modulating unit 14, the unit for modulating the phase of either of the detected outputs $e_S$ and $e_P$ of the respective polarized components from the detecting circuit 9 can be replaced by a unit for shifting the frequency of one of the detected outputs $e_S$ and $e_P$ of the respective polarized components from the detecting circuit 9 by a desired amount with respect to the frequency of the other polarized component.

(h) Description of the Eighth Embodiment

FIG. 17 is a block diagram showing the eighth embodiment of the present invention, and illustrates a heterodyne-type coherent optical communication system having DPSK.

As shown in FIG. 17, the polarization diversity optical receiver 6 comprises, in addition to the optical local oscillating circuit 7, the mixing circuit 8, the detecting circuit 9, the demodulating-adding-discriminating circuit 10, the adding circuit 11A and the control circuit 11B, a local oscillating optical phase modulating unit 13.

The optical local oscillating circuit 7, the mixing circuit 8, the detecting circuit 9, the demodulating-adding-discriminating circuit 10, and the control circuit 11B are the same as in the fifth embodiment, and therefore, a detailed description thereof is omitted.

Note that the adding circuit 11A is used for adding the detected outputs $e_S$ and $e_P$ of the respective polarized components from the bandpass filters 23P and 23S, and to this end, comprises an adder 111'. Also, doublers 29P and 29S are provided for doubling the output frequencies before the addition by the adder 111'. The output gains of the doublers 29P and 29S are adjusted by the automatic gain control circuit (AGC circuit) 15.

The difference from the fifth embodiment shown in FIG. 14 resides in the provision of the doublers 29P and 29S, by which the expansion of the spectrum due to intermediate frequency signal can be cancelled.

In the polarization diversity optical receiver 6 of this eighth embodiment, the phase of the split polarized component of the local oscillating light from the optical local oscillating circuit 7 is modulated by the local oscillating optical phase modulating unit 13. Accordingly, the phase difference between, for example, the detected output signals $e_S$ and $e_P$, can be changed from 0 to $\pi$ as a function of time. As a result, the interrelationship between the detected output signals $e_S$ and $e_P$ can be reduced, and thus the combined signal is not made zero, whereby a desired intermediate frequency signal for the AFC can be obtained.

Note that the gain of the output in which, by employing the doublers 29P and 29S before the addition, the expansion of the spectrum due to the phase information of the intermediate frequency signals is cancelled, is adjusted by the automatic gain control circuit (AGC circuit) 15. The gain adjusting ability of the AGC circuit 15 is obtained as long as the gain margin of the AGC circuit 15 is 7 dB when the mark ratio is 1/11 (minimum mark ratio) or 10/11 (maximum mark ratio). Such a value is easily realized by the standard AGC circuit 15.

Accordingly, in the eighth embodiment an intermediate frequency signal having a desired frequency can be always obtained and a desired gain can be maintained. Thus the required stabilization of the oscillation frequency (intermediate frequency) of the optical local oscillating circuit 7 can be obtained.

Note that, as the local oscillating optical phase modulating unit 13, as in the fifth embodiment, the unit for modulating the phase of one polarized component (P or S) of the local oscillating light from the optical local oscillating circuit 7 can be replaced by a unit for shifting the frequency of one polarized component (P or S) of the local oscillating light from the optical local oscillating circuit 7 by a desired amount with respect to the other polarized component.

(i) Description of the Ninth Embodiment

FIG. 18 is a block diagram showing the ninth embodiment of the present invention, and illustrates a heterodyne-type coherent optical communication system having PSK or DPSK.

The polarization diversity optical receiver 6 is used for the heterodyne-type coherent optical communication system having DPSK and corresponds to the sixth embodiment shown in FIG. 15. Namely, the polarization diversity optical receiver 6 comprises, in addition to the optical local oscillating circuit 7, the mixing circuit 8, the detecting circuit 9, and the demodulating-adding-discriminating circuit 10, the adding circuit 11A to which the outputs from the doublers 29P and 29S are input, and the control circuit 11B, as well as a local oscillating optical phase modulating unit for shifting the frequency of one polarized component of the local oscillating light with respect to the frequency of the other polarized component. The local oscillating optical phase modulating unit oscillating is provided in the optical local oscillating circuit 7.

Namely, the optical local oscillating circuit 7 comprises a first semiconductor laser 71 for outputting a local oscillating light having the P polarized component, and a second semiconductor laser 72 for outputting a local oscillating light having the S polarized component. The frequency difference between the respective semiconductor lasers 71 and 72 is locked to a desired value by an automatic frequency control circuit (AFC circuit) 34. The AFC circuit 34 comprises a photo-electric converting circuit 35 constructed as a double-balance optical receiver, a post amplifier 36, a bandpass filter 37, a frequency discriminating circuit 38, and a drive circuit 39. The photo-electric converting circuit 35, post amplifier 36, bandpass filter 37, frequency discriminating circuit 38, and drive circuit 39 are the same as used in the second embodiment, and therefore, a detailed description thereof is omitted.

In this ninth embodiment, the respective semiconductor lasers 71 and 72 are controlled by the light source stabilizing units 18A and 18B constructed as temperature control units, so that the laser temperature is kept to a constant value.

Moreover, the mixing circuit 8, the detecting circuit 9, the demodulating-adding-discriminating circuit 10, the control circuit 11B, and the transmitter 1 (this transmitter 1 comprises a light source 2, an optical modulating circuit 3, a light source stabilizing unit 4, a waveform shaping circuit 30, an amplifier 31, a differential coding circuit 32, and a crystal oscillator 33) are the same as used in the eighth embodiment, and therefore, a detailed description thereof is omitted.

In the above construction, in the polarization diversity optical receiver shown in FIG. 18, the respective local oscillating lights from the two semiconductor lasers 71 and 72 in the optical local oscillating circuit 7 are in the different polarized states, and the frequency difference between the local oscillating lights is shifted by a predetermined amount. Therefore, the interrelationship between the detected output signals is reduced and the combined signal is not made zero. Thus, the required stabilization of the intermediate frequency is obtained as in the previous embodiments.

Note that, in this embodiment, the means for shifting the phase of one output (polarized components P or S) of the semiconductor lasers 71 and 72 by a desired amount with respect to the phase of the other output (polarized component S or P) can be replaced by a means for modulating the phase of one output (polarized component P or S) of the semiconductor lasers 71 and 72.

(j) Description of the Tenth Embodiment

FIG. 19 is a block diagram showing the tenth embodiment of the present invention and illustrates heterodyne-type coherent optical communication system having PSK.

The polarization diversity optical receiver 6 shown in FIG. 19 is used for the heterodyne-type coherent optical communication system having PSK and corresponds to seventh embodiment. Namely the polarization diversity optical receiver 6 comprises in addition to the optical local oscillating circuit 7, the mixing circuit 8, the detecting circuit 9, and the demodulating-adding-discriminating circuit 10, the adding circuit 11A, to which the outputs from the doublers 29P and 29S are input, and the control circuit 11B, as well as a detected output phase modulation unit 14 for modulating either of the detected outputs $e_S$ and $e_P$ of the respective polarized components from the detecting circuit 9.

The detected outputs phase modulating unit 14 comprises an oscillator 141 and a phase modulator 142 for modulating, by the signal from the output of the oscillating circuit 141, the phase of one (electric signal) of the detected outputs $e_S$ and $e_P$ of the respective polarized components from the detecting circuit 9.

The optical local oscillating circuit 7, the mixing circuit 8, the detecting circuit 9, the demodulating adding discriminating circuit 10, and the control circuit 12 are the same as used in the eighth embodiment, and therefore, a detailed description thereof is omitted. Note that the local oscillating optical phase modulating unit 13 is not provided in the mixing circuit 8.

In the above construction, in the polarization diversity optical receiver 6 shown in FIG. 19, either of the detected outputs $e_S$ and $e_P$ of the respective polarized components from the detecting circuit 9 is modulated by the detected output phase modulating unit 14. Accordingly, the phase difference between, for example, the detected output signals $e_S$ and $e_P$ can be changed from 0 to $\pi$ as a function of time. As a result, the interrelationship between the detected output signals $e_S$ and $e_P$ can be reduced and thus the combined signal is not made zero. Accordingly, the desired intermediate frequency signal for the AFC can be obtained, and the required stabilization of the intermediate frequency can be obtained as in the previous embodiments.

Note that, as the detected output phase modulating unit 14, the unit for modulating the phase of either of the detected outputs $e_S$ and $e_P$ of the respective polarized components from the detecting circuit 9 can be replaced by a unit for shifting the frequency of one of the detected outputs $e_S$ and $e_P$ of the respective polarized components from the detecting circuit 9 by a desired amount with respect to the frequency of the component ($e_S$ and $e_P$). Also, the number of bits for the delay by the delay circuit 14 in the automatic frequency control circuit 11 is not restricted to one bit, but may be 1 bit$\times$N (N is usually an integer, but may not be an integer).

FIG. 20 is a block diagram showing a modification of the first embodiment shown in FIG. 8. In FIG. 20, a mixing circuit 8a is different from the mixing circuit 8 in the first embodiment shown in FIG. 8. The other portions are completely the same as those in FIG. 8.

In the mixing circuit 8a, the signal light Psi transmitted through the optical fiber 5 is mixed with the local oscillating light $P_{lo}$ from the optical local oscillating circuit 7 by a polarized wave maintaining optical fiber coupler 20a before splitting the signal light into the two polarized comments. After mixing, the mixed signal is split into two polarized components (a)Psi and (1−a)Psi. Each split and polarized component is further split by a polarized wave splitting optical fiber coupler 19a into two polarized components, one of which is supplied to the photo-electric converter 21P and the other of which supplied to the photo-electric converter 21S. This construction also provides the same effects as in the first embodiment.

The mixing circuit 8 shown in FIGS. 11 to 19 may also be replaced by the mixing circuit 8a shown in FIG. 20, in a similar way as above.

As described above, according to the coherent optical communication polarization diversity optical receiver of the present invention, when utilizing a baseband combining method, the sum and the difference of the intermediate frequency signals of two polarized components are frequency discriminated, and then combined. Therefore, the interrelationship of the intermediate frequency signals is reduced, and thus either of the first and the second frequency discriminating circuits can be operated. Accordingly, the intermediate frequency signal for stabilizing the optical local oscillating circuit can always be obtained, and as a result, an advantage is gained a required stabilization of the intermediate frequency.

Furthermore, according to the coherent optical communication polarization diversity optical receiver of the present invention, when utilizing a baseband combining method, by simply providing a local oscillating optical phase modulating unit for modulating the phase of one polarized component of the local oscillating light from the optical local oscillating circuit or a detected output phase modulating unit for modulating the phase of either of the detected outputs of the respective polarized components from the detecting circuit, the interrelationship of both intermediate frequency signals is reduced. Thus either of the first and the second frequency discriminating circuits can be operated, and the intermediate frequency signal for stabilizing the optical local oscillating circuit can always be obtained. As a result, an advantage is gained or required stabilization of the intermediate frequency.

What is claimed is:

1. A polarized wave diversity optical receiver for coherent optical communication, comprising:
    optical local oscillating means for oscillating local oscillating light;
    mixing means for mixing signal light transmitted through an optical fiber and the local oscillating light from said optical local oscillating means, to obtain first and second polarized component signals;
    detecting means for detecting the first and second polarized component signals from said mixing means to output first and second intermediate frequency signals; and
    frequency control means for controlling, in accordance with the first and second intermediate frequency signals from said detecting means, the oscillating frequency of said optical local oscillating means, said frequency control means comprising signal conversion means for obtaining an output control signal by combining a sum and a difference of the first and second intermediate frequency signals.

2. A polarized wave diversity optical receiver for coherent optical communication according to claim 1, wherein said mixing means splits the signal light transmitted through the optical fiber and the local oscillating light from said optical local oscillating means into first-type and second-type polarized components, and then mixes the first-type polarized components together and the second-type polarized components together to output the first and second polarized component signals, respectively.

3. A polarized wave diversity optical receiver for coherent optical communication according to claim 1, wherein said mixing means mixes the signal light transmitted through the optical fiber and the local oscillating light from said optical local oscillating means to produce a mixed signal, and then splits the mixed signal into first-type and second-type polarized components to output the first and second polarized component signals, respectively.

4. A polarized wave diversity optical receiver for coherent optical communication according to claim 1,
wherein said frequency control means further comprises delay means for delaying one of the first and second intermediate frequency signals to produce a delayed signal, and
wherein said signal conversion means obtains the output control signal from the sum and the difference of the delayed signal and the other of the first and second intermediate frequency signals not being delayed.

5. A polarized wave diversity optical receiver for coherent optical communication according to claim 1, wherein said frequency control means comprises
a first adder for adding the first and second intermediate frequency signals to produce a summation signal;
a subtracter for taking the difference between the first and second intermediate frequency signals to produce a subtraction signal;
a first frequency discriminating circuit, operatively connected to said first adder, for effecting frequency discrimination with respect to the summation signal from said first adder to produce a first discrimination signal;
a second frequency discriminating circuit, operatively connected to said subtracter, for effecting frequency discrimination with respect to the subtraction signal from said subtracter to produce a first discrimination signal; and
a second adder, operatively connected to said first and second frequency discrimination circuits, for adding the first discrimination signal from said first frequency discriminating circuit and the second discriminating signal from said second frequency discriminating circuit.

6. A polarized wave diversity optical receiver for coherent optical communication according to claim 5, wherein said frequency control means further comprises a delay circuit, operatively connected to said first adder and said subtracter, for delaying, before inputting into said first adder and said subtracter, one of the first and second intermediate frequency signals from said detecting means.

7. A polarized wave diversity optical receiver for coherent optical communication according to claim 6, wherein said delay circuit delays one of the first and second intermediate frequency signals by one bit.

8. A polarized wave diversity optical receiver for coherent optical communication according to claim 5, wherein said frequency control means further comprises first and second automatic gain control means for respectively adjusting the output gains of said first adder and said subtracter.

9. A polarized wave diversity optical receiver for coherent optical communication according to claim 5, wherein said frequency control means comprises first and second power divider means for respectively inputting the first and second intermediate frequency signals from said detecting means into said first adder and said subtracter.

10. A polarized wave diversity optical receiver for coherent optical communication according to claim 5, wherein the signal light received is one of a frequency shift keying modulated signal and an amplitude shift keying modulated signal.

11. A polarized wave diversity optical receiver for coherent optical communication according to claim 5, wherein said frequency control means further comprises first and second doubler means for doubling the frequency of the first and second intermediate frequency signals before inputting the same to said first adder circuit and said subtracter.

12. A polarized wave diversity optical receiver for coherent optical communication according to claim 11, wherein the signal light received is one of a phase shift keying modulated signal and a differential phase shift keying modulated signal.

13. A polarized wave diversity optical receiver for coherent optical communication according to claim 11, wherein said frequency control means further comprises a delay circuit, operatively connected to said detecting means and one of said first and second doubler means, for delaying one of the first and second intermediate frequency signal from said detecting means before inputting the same to said first adder and said subtracter.

14. A polarized wave diversity optical receiver for coherent optical communication, comprising:
optical local oscillating means for oscillating local oscillating light having first-type and second-type polarized components;
mixing means for mixing signal light transmitted through an optical fiber and the local oscillating light from said optical local oscillating means, to obtain first and second polarized component signals;
detecting means for detecting the signals of the first and second polarized component signals from said mixing means to output first and second intermediate frequency signals;
addition means for adding the first and second intermediate frequency signals from said detecting means to produce a summation signal;
control means for controlling said optical local oscillating means based on the summation signal from said addition means; and
local oscillating optical phase modulating means for modulating one of the first-type and second-type polarized components of the local oscillating light from said optical local oscillating means.

15. A polarized wave diversity optical receiver for coherent optical communication according to claim 14, wherein said mixing means splits the signal light transmitted through the optical fiber and the local oscillating light from said optical local oscillating means into first-type and second-type polarized components, and then mixes the first-type polarized components together and the second-type polarized components together to output the first and second polarized component signals, respectively.

16. A polarized wave diversity optical receiver for coherent optical communication according to claim 15, wherein said receiver further comprises wave dividing means for dividing the local oscillating light from said optical local oscillating means into first-type and second-type polarized components, and wherein said local oscillating optical phase modulating means modulates a phase of one of the first-type and second-type polarized components of the local oscillating light supplied by said wave dividing means.

17. A polarized wave diversity optical receiver for coherent optical communication according to claim 16, wherein said local oscillating optical phase modulating means performs phase modulation by changing a phase difference between the first-type and second-type polarized components as a function of time.

18. A polarized wave diversity optical receiver for coherent optical communication according to claim 16, further comprising first and second doubler means for doubling the frequency of the first and second intermediate frequency signals before inputting the same to said addition means.

19. A polarized wave diversity optical receiver for coherent optical communication according to claim 15, wherein the signal light is one of a frequency shift keying modulated signal and an amplitude shift keying modulated signal.

20. A polarized wave diversity optical receiver for coherent optical communication according to claim 15, wherein said receiver further comprises wave dividing means for dividing the local oscillating light from said optical local oscillating means into first-type and second-type polarized components, and wherein said local oscillating optical phase modulating means shifts the frequency of one of the first-type and second-type polarized components of the local oscillating light supplied by said wave dividing means by a predetermined amount with respect to the frequency of the other one of the first-type and second-type polarized components.

21. A polarized wave diversity optical receiver for coherent optical communication according to claim 20, further comprising first and second doubler means for doubling the frequency of the first and second intermediate frequency signals before inputting the same to said addition means.

22. A polarized together wave diversity optical receiver for coherent optical communication according to claim 14, wherein said mixing means mixes the signal light transmitted through the optical fiber and the local oscillating light from said optical local oscillating means to produce a mixed signal, and then splits the mixed signal into first-type and second-type polarized components to output the first and second polarized component signals, respectively.

23. A polarized wave diversity optical receiver for coherent optical communication according to claim 14, wherein, when a signal power of the signal light is assumed to be 1, the power distribution of the first-type and second-type polarized components is expressed such that the power of the first-type polarized wave component is (a) and the power of the second-type polarized component is (1−a), and the power distribution of the first-type and second-type polarized components of the local oscillating light is equally divided.

24. A polarized wave diversity optical receiver for coherent optical communication according to claim 14, wherein said optical local oscillating means comprises first and second semiconductor lasers, operatively connected to said mixing means and said control means, for respectively outputting the first-type and second-type polarized components of the local oscillating light, an output phase or an output frequency of one of the first-type and second-type polarized components respectively output from said first and second semiconductor lasers being modulated.

25. A polarized wave diversity optical receiver for coherent optical communication according to claim 24, wherein the signal light is one of a frequency shift keying modulated signal and an amplitude shift keying modulated signal.

26. A polarized wave diversity optical receiver for coherent optical communication according to claim 24, further comprising first and second doubler means for doubling the frequency of the first and second intermediate frequency signals before inputting the same to said addition means.

27. A polarized wave diversity optical receiver for coherent optical communication according to claim 24, wherein said receiver further comprises frequency control means for controlling an output frequency difference between the first-type and second-type polarized components output from said first and second semiconductor lasers, and wherein the output frequency difference between the output frequency of said first and second semiconductor lasers is locked to a predetermined value by said frequency control means.

28. A polarization wave diversity optical receiver for coherent optical communication, comprising:
optical load oscillating light having first-type and second-type polarized components;
mixing means for mixing signal light transmitted through an optical fiber and the local oscillating light from said optical local oscillating means, to obtain first and second polarized component signals;
detecting means for detecting the first and second polarized components from said mixing means to output first and second intermediate frequency signals;
addition means for adding the first and second intermediate frequency signals from said detecting circuit means to produce a summation signal;
control means for controlling said optical load oscillating means depending on the summation signal from said addition means; and
detecting output signal modulating means for modulating one of the first and second intermediate frequency signals from said detecting means.

29. A polarized wave diversity optical receiver for coherent optical communication according to claim 28, wherein said mixing means splits the signal light transmitted through the optical fiber and the local oscillating light from said optical local oscillating means into first-type and second-type polarized components, and then mixes the first-type polarized components together and the second-type polarized components together to output the first and second polarized component signals, respectively.

30. A polarized wave diversity optical receiver for coherent optical communication according to claim 29, further comprising first and second means for doubling the frequency of the first and second intermediate signals before inputting the same to said addition means.

31. A polarized wave diversity optical receiver for coherent optical communication according to claim 30, wherein the signal light received is one of a phase shift keying modulated signal and a differential phase shift keying modulated signal.

32. A polarized wave diversity optical receiver for coherent optical communication according to claim 28, wherein said mixing means mixes the signal light transmitted through the optical fiber and the local oscillating light from said optical local oscillating means to produce a mixed signal, and then splits the mixed signal into first-type and second-type polarized components to output the first and second polarized component signals, respectively.

33. A polarized wave diversity optical receiver for coherent optical communication according to claim 32, further comprising first and second doubler means for doubling the frequency of the first and second intermediate signals before inputting the same to said addition means.

34. A polarized wave diversity optical receiver for coherent optical communication according to claim 28, wherein said detected output signal modulating means is for modulating a phase of one of the first and second intermediate signals.

35. A polarized wave diversity optical receiver for coherent optical communication according to claim 34, wherein said detected output signal modulating means performs phase modulation by changing a phase difference between the first-type and second-type polarized components as a function of time.

36. A polarized wave diversity optical receiver for coherent optical communication according to claim 34, wherein the signal light is one of a frequency shift keying modulated signal and an amplitude shift keying modulated signal.

37. A polarized wave diversity optical receiver for coherent optical communication according to claim 28, wherein said detected output signal modulating means is for substantially shifting a phase of one of the first and second intermediate signals.

38. A polarized wave diversity optical receiver for coherent optical communication according to claim 28, wherein said detected output signal modulating means is for modulating a frequency of one of the first and second intermediate signals.

39. A polarized wave diversity optical receiver for coherent optical communication according to claim 28, wherein, when a signal power of the signal light is assumed to be 1, the power distribution of the first-type and second-type polarized components is expressed such that the power of the first-type polarized component is (a) and the power of the second-type polarization component is $(1-a)$, and the power distribution of the first-type and second-type polarized components of the local oscillating light is equally divided.

* * * * *

UNITED STATES PATENT AND TRADEMARK OFFICE
CERTIFICATE OF CORRECTION

PATENT NO. : 4,965,858
DATED : OCTOBER 23, 1990
INVENTOR(S) : TAKAO NAITO ET AL.

It is certified that error appears in the above-identified patent and that said Letters Patent is hereby corrected as shown below:

Col. 1, line 23, "wa components" should be --wave components are--.

Col. 8, line 21, "light," should be --light--.

Col. 9, line 15, "a" should be --an--.

Col. 13, line 5, "embodiment," should be --embodiment.--.

Col. 23, line 50, "together" should be deleted.

Col. 24, line 36, "load" should be --local--;
line 36, "oscillating light" should be --oscillating means for oscillating local oscillating light--;
line 50, "load" should be --local--;
line 68, "second means" should be --second doubler means--.

Signed and Sealed this

Twenty-third Day of June, 1992

Attest:

DOUGLAS B. COMER

*Attesting Officer*   *Acting Commissioner of Patents and Trademarks*